US012676030B2

(12) United States Patent
Tomatsu et al.

(10) Patent No.: US 12,676,030 B2
(45) Date of Patent: Jul. 7, 2026

(54) IN-VEHICLE COMMUNICATION SYSTEM, DATA STRUCTURE OF REPROGRAMMING POLICY METADATA, AND DATA STRUCTURE OF DOWNLOAD METADATA

(71) Applicant: DENSO CORPORATION, Kariya-city (JP)

(72) Inventors: Koto Tomatsu, Kariya-city (JP); Hideo Yoshimi, Kariya-city (JP); Masaaki Abe, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 200 days.

(21) Appl. No.: 18/389,895

(22) Filed: Dec. 20, 2023

(65) Prior Publication Data

US 2024/0119763 A1 Apr. 11, 2024

Related U.S. Application Data

(63) Continuation of application No. PCT/JP2022/022158, filed on May 31, 2022.

(30) Foreign Application Priority Data

Jun. 29, 2021 (JP) ................................ 2021-107835

(51) Int. Cl.
*G06F 8/65* (2018.01)
*G07C 5/00* (2006.01)

(52) U.S. Cl.
CPC .................................... *G07C 5/008* (2013.01)

(58) Field of Classification Search
CPC ........................................................ G06F 8/65
See application file for complete search history.

(56) References Cited

U.S. PATENT DOCUMENTS

2019/0108014 A1* 4/2019 Nakamura .............. B60R 16/02
2021/0157568 A1 5/2021 Sakurai et al.
2021/0165644 A1 6/2021 Harata et al.
(Continued)

FOREIGN PATENT DOCUMENTS

JP 2020027624 A 2/2020
JP 2020027633 A 2/2020
(Continued)

OTHER PUBLICATIONS

Specification of Update Configuration Management Autosar AP R20-11, Document ID No. 706, p. 50, 52, 53.

*Primary Examiner* — Jae U Jeon
(74) *Attorney, Agent, or Firm* — Harness, Dickey & Pierce, P.L.C.

(57) ABSTRACT

An in-vehicle communication system includes a center device that transmits update data to a target device as an electronic control unit installed in a vehicle, a master device that is installed in the vehicle, receives the update data as a distribution package, and transfers the update data to the target device, and the target device that writes the update data transferred from the master device into a storage portion. The center device transmits reprogramming policy metadata to the master device. The master device requests the center device for download metadata. The master device interprets the download metadata, acquires necessary data, and perform data update control of the target device.

29 Claims, 26 Drawing Sheets

(56) References Cited

U.S. PATENT DOCUMENTS

| | | | | |
|---|---|---|---|---|
| 2022/0222054 | A1 * | 7/2022 | Sakai | G06F 8/65 |
| 2022/0284743 | A1 | 9/2022 | Yoshimi et al. | |

FOREIGN PATENT DOCUMENTS

| | | | | | |
|---|---|---|---|---|---|
| JP | 2021032593 | A | | 3/2021 | |
| JP | 2022133732 | A | | 9/2022 | |
| KR | 20160041446 | A | * | 4/2016 | H04L 41/082 |

* cited by examiner

FIG. 3

· REPROGRAMMING POLICY METADATA

1. REPROGRAMMING POLICY METADATA VERSION : 1.0.0/2.0.0/…

2. DISTRIBUTION LAYER
   1. COMMUNICATION PROTOCOL : Uptane/OMA-DM/SSL/…none
   2. COMMUNICATION METHOD : CELLULAR/SMARTPHONE/USB MEMORY 3. MASTER LAYER (ONE OR MORE)
   1. PF : AP/CP/AGL/Android/…
   2. CONTROL METHOD : PARAMETER /SCRIPT/…

4. TARGET LAYER (ONE OR MORE)
   1. PF : AP/CP/AGL/Android/…
   2. TRANSFER METHOD : STORAGE METHOD/ STREAMING METHOD/…
   3. CONTROL METHOD : PARAMETER /SCRIPT/…
   4. TARGET ID : (OPTION)

---

1. PF : AP/CP/AGL/Android/…
   2. TRANSFER METHOD : STORAGE METHOD/ STREAMING METHOD/…
   3. CONTROL METHOD : PARAMETER /SCRIPT/…
   4. TARGET ID : (OPTION)

FIG. 4

- DOWNLOAD METADATA

| |
|---|
| 1. DOWNLOAD METADATA VERSION : 1.0.0/2.0.0/… |
| 2. DISTRIBUTION LAYER<br>- URI : "xxx/uptane.zip"<br>- DATA NAME : "uptane.zip"<br>- DATA SIZE : "zzz"<br>- HASH VALUE : "zzz"<br>- TARGET ID : "zzz"<br>- TRANSFER METHOD : "storage" |
| 3. MASTER LAYER (PLURAL)<br>- URI : "xxx/ucm1.tar"<br>- DATA NAME : "ucm1.tar"<br>- DATA SIZE : "xxx"<br>- HASH VALUE : "xxx"<br>- TARGET ID : "xxx"<br>- PF : "xxx"<br>- TRANSFER METHOD : "storage" |
| 4. TARGET LAYER (PLURAL)<br>- URI : "xxx/ucm2.tar"<br>- DATA NAME : "ucm2.tar"<br>- DATA SIZE : "yyy"<br>- HASH VALUE : "yyy"<br>- TARGET ID : "yyy"<br>- PF : "yyy"<br>- TRANSFER METHOD : "streaming" |

FIG. 20

| | |
|---|---|
| CRYPTOGRAPHIC ALGORITHM | (COMMON KEY) AES/DES, (PUBLIC KEY) RSA/ECC |
| SIGNATURE ALGORITHM | (COMMON KEY) CBC-MAC, C-MAC, (PUBLIC KEY) DSA |
| KEY ID | USED TO IDENTIFY THE KEY |
| ENCRYPTION MODE | Enc then MAC, MAC then ENC, ENC and MAC, ··· |
| ENCRYPTION OR SIGNATURE TARGET | SPECIFIC FILE OR DATA CAN BE SPECIFIED (SUCH AS PROTECTING ONLY AUTOMATIC OPERATION ON.DAT IN ZIP FILE) |
| AREA SPECIFICATION | SELECT ENTIRE FILE OR RANGE |
| OFFSET SIZE | SPECIFY THE ORDER OF BYTE FROM THE BEGINNING TO START PROTECTING SUBSEQUENT BYTES (WHEN RANGE SELECTED) |
| PROTECTED DATA SIZE | SPECIFY HOW MANY BYTES TO PROTECT (WHEN RANGE SELECTED) |

FIG. 25

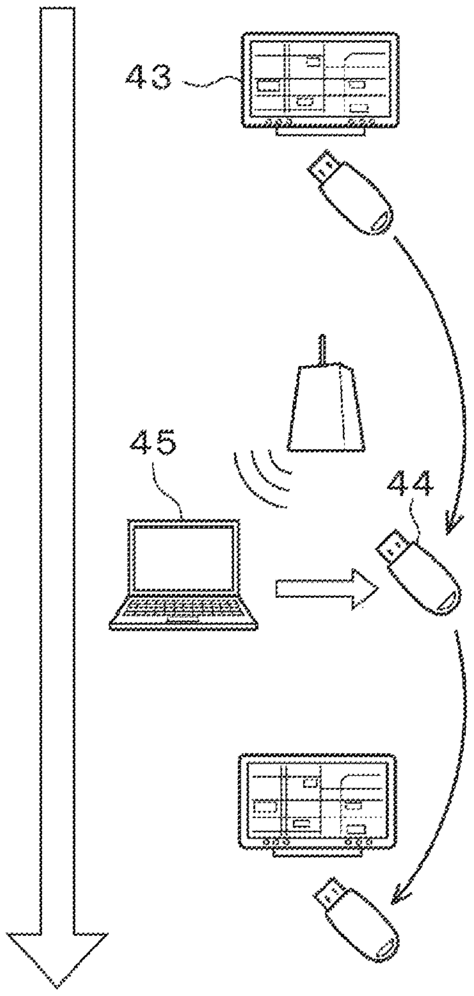

[OPERATION INSIDE VEHICLE]
(1) OPERATE NAVIGATION SYSTEM.
(2) WRITE VEHICLE CONFIGURATION INFORMATION (DIGITALLY SIGNED USING VEHICLE'S PRIVATE KEY) TO USB MEMORY.
(3) REMOVE USB MEMORY.

[OPERATION ON PC]
(4) CONNECT PC APPLICATION TO USB MEMORY AND TRANSMIT VEHICLE CONFIGURATION INFORMATION TO OTA CENTER.
SEARCH FOR APPLICABLE PKG ACCORDING TO SUCCESSFUL VERIFICATION ON DIGITAL SIGNATURE AT OTA CENTER.
(5) DOWNLOAD APPLICABLE PKG USING PC APPLICATION AND WRITE PKG TO USB MEMORY.
(SUPPLY PKG WITH VEHICLE MODEL INFORMATION OR VEHICLE CONFIGURATION INFORMATION BEFORE UPDATE)

[OPERATION INSIDE VEHICLE]
(6) RETURN USB MEMORY TO NAVIGATION SYSTEM.
(7) OPERATE NAVIGATION SYSTEM.
(8) TRANSMIT RP METADATA/DL METADATA IN USB MEMORY TO OTA MASTER.
(9) ALLOW OTA MASTER TO VERIFY WHETHER PKG CONFORMS TO SUBJECT VEHICLE
(10) DOWNLOAD, INSTALL, AND ACTIVATE PKG ON TARGET ECU ACCORDING TO SUCCESSFUL PKG VERIFICATION.

IN-VEHICLE COMMUNICATION SYSTEM, DATA STRUCTURE OF REPROGRAMMING POLICY METADATA, AND DATA STRUCTURE OF DOWNLOAD METADATA

CROSS REFERENCE TO RELATED APPLICATIONS

The present application is a continuation application of International Patent Application No. PCT/JP2022/022158 filed on May 31, 2022 which designated the U.S. and claims the benefit of priority from Japanese Patent Application No. 2021-107835 filed on Jun. 29, 2021. The entire disclosures of all of the above applications are incorporated herein by reference.

TECHNICAL FIELD

The present disclosure relates to a system communicating between a center device and a master device as well as a target device installed in a vehicle, and a data structure of data used for the system.

BACKGROUND

A related art discloses the technology in which a server delivers the ECU update programs to in-vehicle devices based on OTA (Over The Air) and the vehicle rewrites the update programs.

SUMMARY

According to one example, an in-vehicle communication system includes a center device that transmits update data to a target device as an electronic control unit installed in a vehicle, a master device that is installed in the vehicle, receives the update data as a distribution package, and transfers the update data to the target device, and the target device that writes the update data transferred from the master device into a storage portion. The center device transmits reprogramming policy metadata to the master device. The master device requests the center device for download metadata. The master device interprets the download metadata, acquires necessary data, and perform data update control of the target device.

BRIEF DESCRIPTION OF THE DRAWINGS

The above and other objects, features, and advantages of the present disclosure will become more apparent from the following detailed description made by reference to the accompanying drawings. In the drawings:

FIG. 3 is a diagram illustrating data items in reprogramming policy metadata;

FIG. 4 is a diagram illustrating data items in download metadata;

FIG. 20 is a diagram illustrating the contents of information about encryption and signature processes for DL metadata according to a fourth embodiment;

FIG. 25 is a diagram conceptually illustrating a flow of processes among devices according to a fifth embodiment, as well as an operation procedure performed by the user on each device.

DETAILED DESCRIPTION

Figure 1:
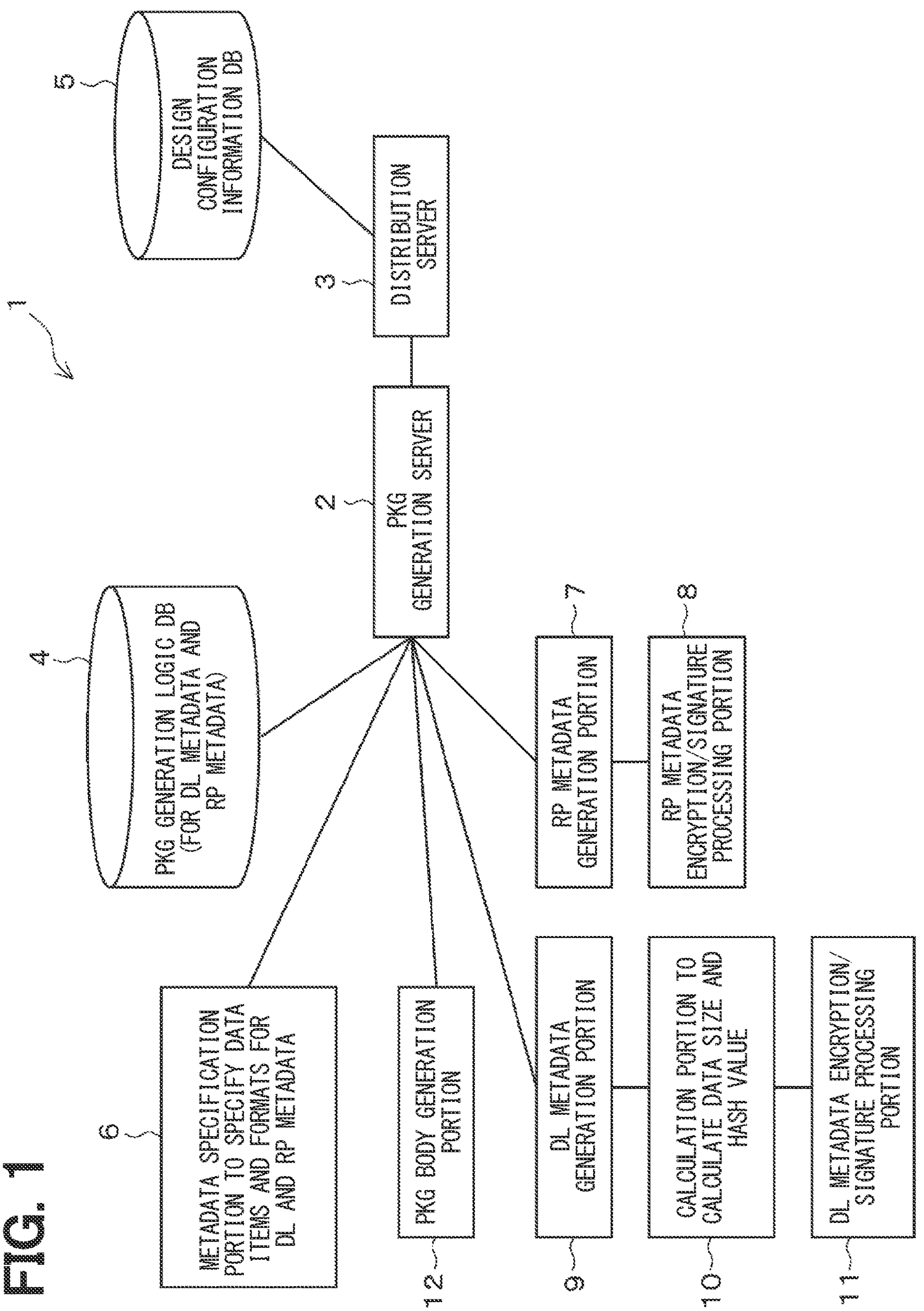
FIG. 1 is a functional block diagram schematically illustrating the configuration of an OTA center in the in-vehicle communication system according to a first embodiment.

In recent years, there has been an increase in the scale of application programs for vehicle control and diagnosis installed in electronic control units (ECUs) for vehicles along with diversified vehicle controls such as driving support functions and automatic driving functions. There has been also an increase in chances of reprogramming to rewrite ECU application programs due to version upgrades such as function improvements. For example, the development of communication networks also promotes connected car technologies. Under these circumstances, for example, a related art discloses the technology in which a server delivers the ECU update programs to in-vehicle devices based on OTA (Over The Air) and the vehicle rewrites the update programs.

The update program is rewritten according to a storage method and a streaming method. The storage method downloads all update programs from the center device to the vehicle memory and then performs updates. The streaming method performs updates while downloading update programs from the center device to the vehicle. In terms of the package structure to distribute update programs according to the ECU platform, the specifications of JASPAR (Japan Automotive Software Platform and Architecture) specify data requirements applicable to the Classic Platform (CP) running on a static OS (Operating System) compliant to the standards body AUTOSAR (AUTomotive Open System ARchitecture). AUTOSAR specifies data requirements applicable to a new type of adaptive platform (AP) running on a dynamic OS.

The ECUs installed on vehicles may mixedly use storage and streaming methods or CP and AP types. In the future, the onboard ECUs may be compatible with in-vehicle Linux (registered trademark) such as Automotive Grade Linux (AGL) or may optionally use smartphones, for example, to download data. However, the current OTA technology does not take into account the above-described variations of communication modes.

The present disclosure has been made in consideration of the foregoing. The present disclosure provides an in-vehicle communication system, a data structure of reprogramming policy metadata, and a data structure of download metadata used for that system capable of communication through the use of flexible data formats without regard to diversification of platforms or distribution methods for electronic control units.

According to one aspect of the present disclosure, An in-vehicle communication system comprising: a center device that transmits update data as a distribution package to an electronic control unit as a target device installed in a vehicle; a master device that is installed in the vehicle, receives the distribution package, and transfers the update data to the target device; and the target device that writes the update data transferred from the master device to a storage portion. The center device transmits reprogramming policy metadata indicating configuration information on the distribution package to the master device. The reprogramming policy metadata has a three-layer structure including a distribution layer to store communication protocol and communication destination information, a master layer to store information on a platform of the master device, and a target layer to store information on a platform of the target device. When interpreting the reprogramming policy metadata and determining that the distribution package is compatible with a subject vehicle, the master device requests the center device for download metadata that stores control information for acquiring data needed for each of the three layers. When the center device transmits the download metadata to the master device and the master device interprets the download metadata and acquires necessary data, the master device performs data update control of the target device.

According to another aspect of the present disclosure, an in-vehicle communication system comprising: a center device that transmits update data to a target device as an electronic control unit installed in a vehicle; a master device that is installed in the vehicle, receives the update data as a distribution package, and transfers the update data to the target device; the target device that writes the update data transferred from the master device into a storage portion. The center device transmits reprogramming policy metadata indicating configuration information on the distribution package to the master device. When interpreting the reprogramming policy metadata and determining that the distribution package is compatible with a subject vehicle, the master device requests the center device for download metadata indicating information for acquiring the update data for the target device. When the center device transmits the download metadata to the master device, the master device interprets the download metadata, acquires necessary data, and perform data update control of the target device.

According to another aspect of the present disclosure, an in-vehicle communication system comprising: a center device that transmits update data to a target device as an electronic control device installed in a vehicle; and a master device that is installed in the vehicle, receives the update data as a distribution package, and transfers the update data to the target device. The center device transmits reprogramming policy metadata indicating configuration information on the distribution package to the master device. When the master device interprets the reprogramming policy metadata and determines that the distribution package is compatible with a subject vehicle, the master device requests the center device for download metadata indicating information for acquiring update data for the target device. When the center device transmits the download metadata to the master device, the master device interprets the download metadata to obtains necessary data and performs data update control including writing update data into a storage unit of the target device.

The reprogramming policy metadata represents the configuration information on the distribution package. In other words, the reprogramming policy metadata contains information representing the package configuration type. The main purpose of reprogramming policy metadata is to allow the vehicle to verify the contents of the data and prevent package delivery errors. The download metadata stores control information to acquire data. In other words, the download metadata specifies the contents so that the master device can identify the information on downloading update data corresponding to each of multiple target ECUs. The metadata is organized into a three-layer structure of distribution, master, and target. It is possible to flexibly define transfer methods, platform types, and distribution package types, regardless of a possible increase therein, and update data on the target device.

The in-vehicle communication system according to one example, the reprogramming policy metadata includes, as parameters for the master layer, platform type information on the master device and control method type information on a platform. The reprogramming policy metadata includes, as parameters for the target layer, platform type information on the target device, control method type information on a platform, and type information on a data transfer method from the center device to the target device. The master device compares each of the information with design configuration information managed by the master device itself to determine whether the distribution package is compatible with the subject vehicle.

The design configuration information relates to a vehicle mounted with the master device and the target device and to the hardware and software of the master device and the target device. The above-described type information is contained in parameters of reprogramming policy metadata for the master and target layers, enabling the master device to interpret the type information and transfer data to the target device.

The in-vehicle communication system according to one example, the download metadata includes, as parameters for each layer, URI (Uniform Resource Identifier) of a data acquisition destination, a hash value attached to data, ID of the target device, and type information on data transfer method from the center device. The download metadata includes, as parameters for the master layer and the target layer, platform type information on the master device and the target device. The master device acquires data needed for each layer at necessary timing based on each of the information and performs data update control of the target device.

The above-described information is contained in the parameters of each layer of download metadata, enabling the master device to interpret this information and transfer data to the target device based on more specific procedures.

First Embodiment

As illustrated in FIG. 1, an OTA center 1 for the in-vehicle communication system includes a PKG generation server 2, a distribution server 3, a PKG generation logic DB 4, and a design configuration information DB 5. PKG stands for "package" and DB stands for "database." Functional portions related to the PKG generation server 2 are illustrated outside. The OTA center 1 transmits update data to the vehicle-side system 31 illustrated in FIG. 2. The update data is used to update the control program of the target ECU 33 and is stored in the distribution package for transmission. Prior to the transmission of the distribution package, in the present embodiment, reprogramming policy metadata and download metadata, containing necessary information are transmitted to the OTA master 32 of the vehicle-side system 31. Hereinafter, the reprogramming policy metadata may be referred to as "RP metadata" and the download metadata may be referred to as "DL metadata."

The expediential classifications are used for the server, the database, and various processing portions in the server according to the present embodiment. There may be available other modes to achieve similar functions. The OTA master is divided into various processing portions for explanatory convenience. For example, the OTA master may be integrated or divided into multiple units in terms of software or hardware.

The PKG generation logic DB 4 stores data corresponding to each piece of information to generate RP metadata and DL metadata. A metadata specification portion 6 performs processing to specify items and data formats for the RP and DL metadata. An RP metadata generation portion 7 generates RP metadata. The encryption/signature processing portion 8 encrypts the generated RP metadata and adds a digital signature to it.

A DL metadata generation portion 9 generates DL metadata. A calculation portion 10 calculates the data size of the update data and calculates a hash value of the update data. An encryption/signature processing portion 11 encrypts the generated DL metadata and adds a digital signature to it. A PKG body generation portion 12 generates the body part of a distribution package including update data, for example.

The PKG generation server 2 transfers the RP metadata, DL metadata, and distribution package, generated by the above-described processing portions, to the distribution server 3. The distribution server 3 accesses the design configuration information DB 5 and acquires the configuration information on a vehicle where the distribution package is transmitted. The distribution server 3 then supplies the configuration information to the distribution package.

Figure 2:
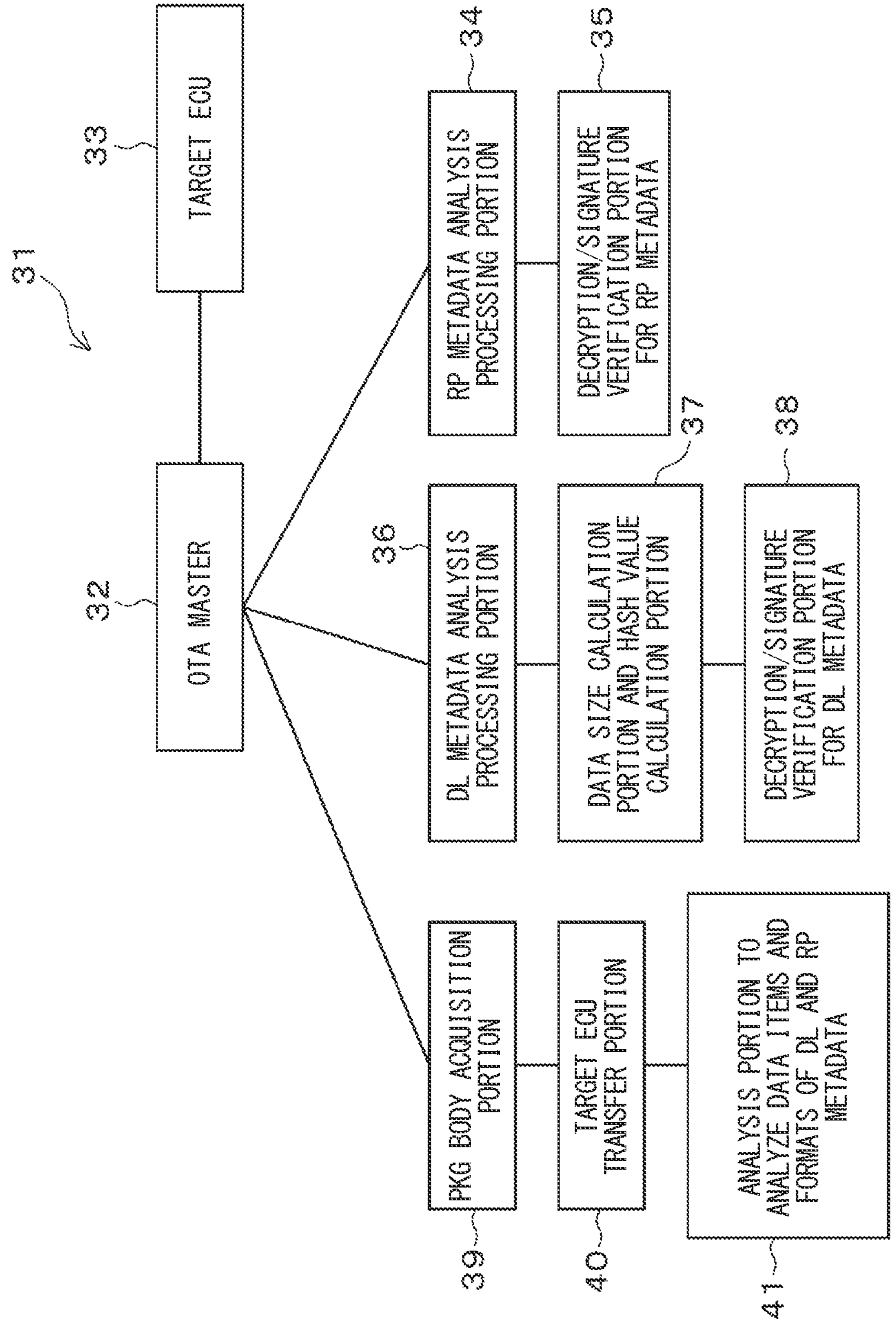
FIG. 2 is a functional block diagram schematically illustrating the configuration of an OTA master.

As illustrated in FIG. 2, the vehicle-side system 31 includes an OTA master 32 and a target ECU 33. The OTA master 32 is composed of a DCM (Data Communication Module) 32A and a central ECU 32B illustrated in FIG. 6. Practically, multiple target ECUs 33 are available.

An RP metadata analysis processing portion 34 analyzes RP metadata received by the OTA master 32. A decryption/signature verification portion 35 performs verification by using the digital signature given to the RP metadata and decrypts the RP metadata.

An DL metadata analysis processing portion 36 analyzes DL metadata received by the OTA master 32. A calculation portion 37 calculates the data size of the update data and calculates a hash value of the update data. The update data is a parameter of the DL metadata. A decryption/signature verification portion 38 performs verification by using the digital signature given to the DL metadata and decrypts the DL metadata.

A PKG body acquisition portion 39 acquires the body part of a distribution package received by the OTA master 32. A transfer portion 40 transfers the update data included in the acquired distribution package to the target ECU 33. An analysis portion 41 analyzes items and data formats of the RP and DL metadata.

«Reprogramming Policy Metadata»

The RP metadata illustrated in FIG. 3 is transmitted from the OTA center 1 to the OTA master 32 before the distribution package is downloaded.

<RP Metadata Version>

The RP metadata version stores version information such as "1.0.0" or "2.0.0."

<Communication Layer>

The distribution layer stores information on the protocol used to communicate with the OTA center 1 such as Uptane (registered trademark) or OMA-DM (Open Mobile Alliance-Device Management), "cellular" indicating the OTA master 32 as a communication method, and other information such as a smartphone or USB memory to be described later.

<Master Layer>

The master layer stores information on the OTA master 32 whose platform (PF) is AP, CP, AGL (Automotive Grade Linux), or Android (registered trademark), for example. The specifications according to the general incorporated association JASPAR specify the data requirements applicable to the classic platform (CP) running on the static OS according to the standardizing body AUTOSAR in terms of the package structure to distribute update programs appropriate for the ECU platforms. AUTOSAR specifies the data requirements applicable to a new type of adaptive platform (AP) running on a dynamic OS. AGL represents an onboard Linux. Android represents Android Automotive OS.

Moreover, the master layer stores information on the control method such as "parameter" for processing according to parameters set according to a specific format or "script" for processing based on a freer description format without the use of a specific format, for example.

<Target Layer>

This information corresponds to the target ECU 33. The PF, the transfer method, and the control method conform to those described above. The target ID represents an ID corresponding to the target ECU 33 and is stored as an option.

«Download Metadata»

The DL metadata illustrated in FIG. 4 is transmitted from the OTA center 1 to the OTA master 32 following the RP metadata.

<Distribution Layer>

When the communication protocol is Uptane, for example, the distribution layer provides information to acquire Uptane metadata and stores the corresponding URI, data name, data size, hash value, target ID, and transfer method, for example.

<Master Layer>

The master layer provides information to acquire Vehicle PKG, for example, and stores the same items as the distribution layer. Multiple master layers may be available.

<Target Layer>

The master layer provides information to acquire Software PKG, for example, and stores the same items as the distribution layer. Vehicle PKG and Software PKG are described on pages 50, 52, and 53 of "Specification of Update Configuration Management AUTOSAR AP R20-11, Document ID No. 706," for example. Refer to the related description in the document.

The description below explains the differences between AP and CP. AP and CP represent software platforms. The software platform is also called a software architecture. CP stands for AUTOSAR Classic Platform. AP stands for AUTOSAR Adaptive Platform. ECUs that operate based on the CP specifications may be referred to as CP ECUs or CP's ECUs. ECUs that operate based on the AP specifications may be referred to as AP ECUs or AP's ECUs.

AP and CP differ in operating systems (OSs) or development languages used. CP ECU and AP ECU differ in the structures of receivable packages. The difference in the package structures mainly originates from the difference in ECU processing performances. Generally, CP ECU indicates low processing performance. The specification data contained in the package is also written in binary. The package data structure is easy to interpret and process even on ECUs with low processing performance.

Contrastingly, AP ECUs indicate high processing performance, making it possible to install a parser function that analyzes structural character data written in some language and converts the data into a program-friendly data structure. The data structure can use an object-oriented data format such as JSON (JavaScript Object Notation) instead of simple binary data. The package data structure is flexible.

Figure 5:
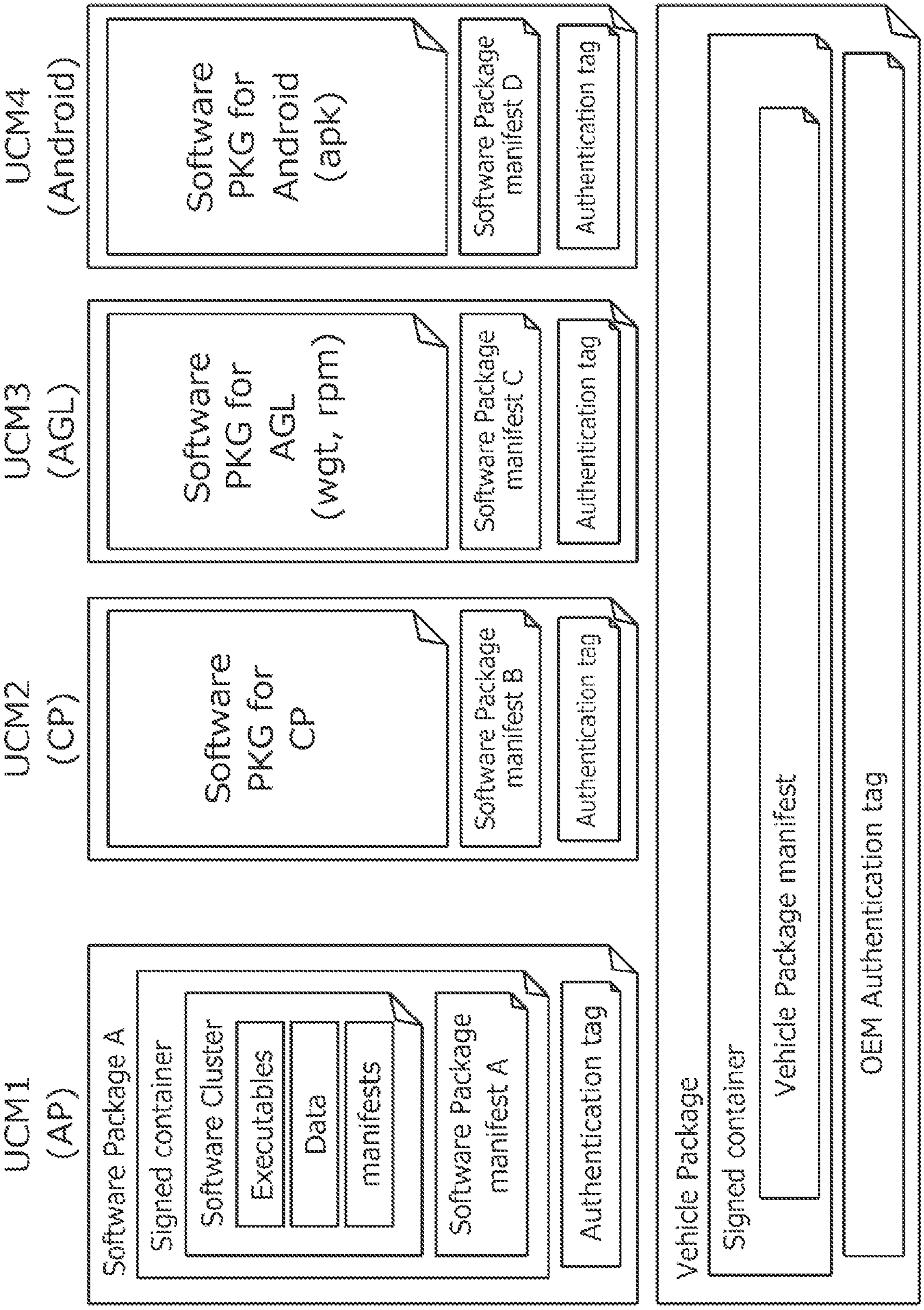
FIG. 5 is a diagram illustrating data packages corresponding to a master layer and a target layer.

FIG. 5 illustrates an enhancement of the package configuration corresponding to the above-described AP according to the present embodiment. Acquisition of Vehicle PKG manifest of Vehicle PKG based on the master layer information makes it possible to acquire information about a distribution procedure, such as which package should be transferred to which ECU, in what order, and when.

Four different software PKGs corresponding to the target layers are used for the platforms AP, CP, AGL, and Android corresponding to UCM (Update Configuration Management) 1 through 4. The platforms AGL and Android are not specified in AUTOSAR but may be also available when the ECU adopts these platforms. The UCM is explained in AUTOSAR and a detailed description is omitted for purposes of brevity.

Figure 6:
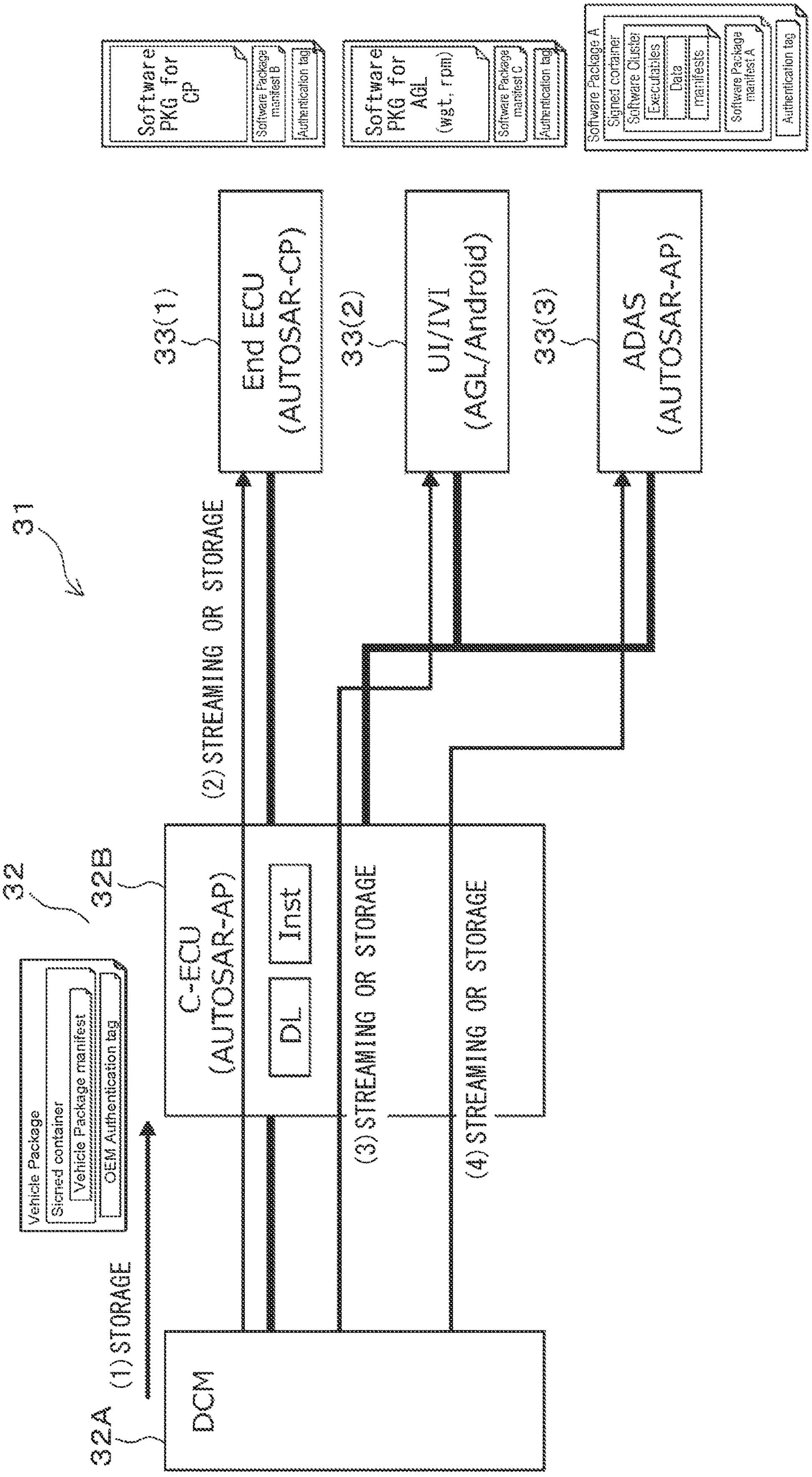
FIG. 6 is a diagram conceptually illustrating a flow of data transfer inside the vehicle-side system.

In FIG. 6, the DCM 32A is an onboard communication device that performs data communication with OTA center 1 via a communication network. The DCM 32A downloads the distribution package from the distribution server 3, extracts update data from the distribution package, and transfers the update data to the central ECU 32B. The central ECU 32B is a vehicle gateway device and includes a data relay function. The central ECU 32B acquires update data from the DCM 32A and distributes the update data to the target ECU 33 whose application program is to be rewritten. Hereinafter, the central ECU may be denoted as "C-ECU".

FIG. 6 conceptually illustrates the flow of update data transferred within the vehicle-side system 31. The central ECU 32B acquires Vehicle PKG based on a storage method and then controls the distribution of Software PKG to the targets ECUs 33(1) through 3(3) according to the information. In the target ECU 33(2), UI stands for a user interface and IVI stands for in-vehicle infotainment. In the target ECU 33(3), ADAS denotes an advanced driver assistance system.

Figure 7:
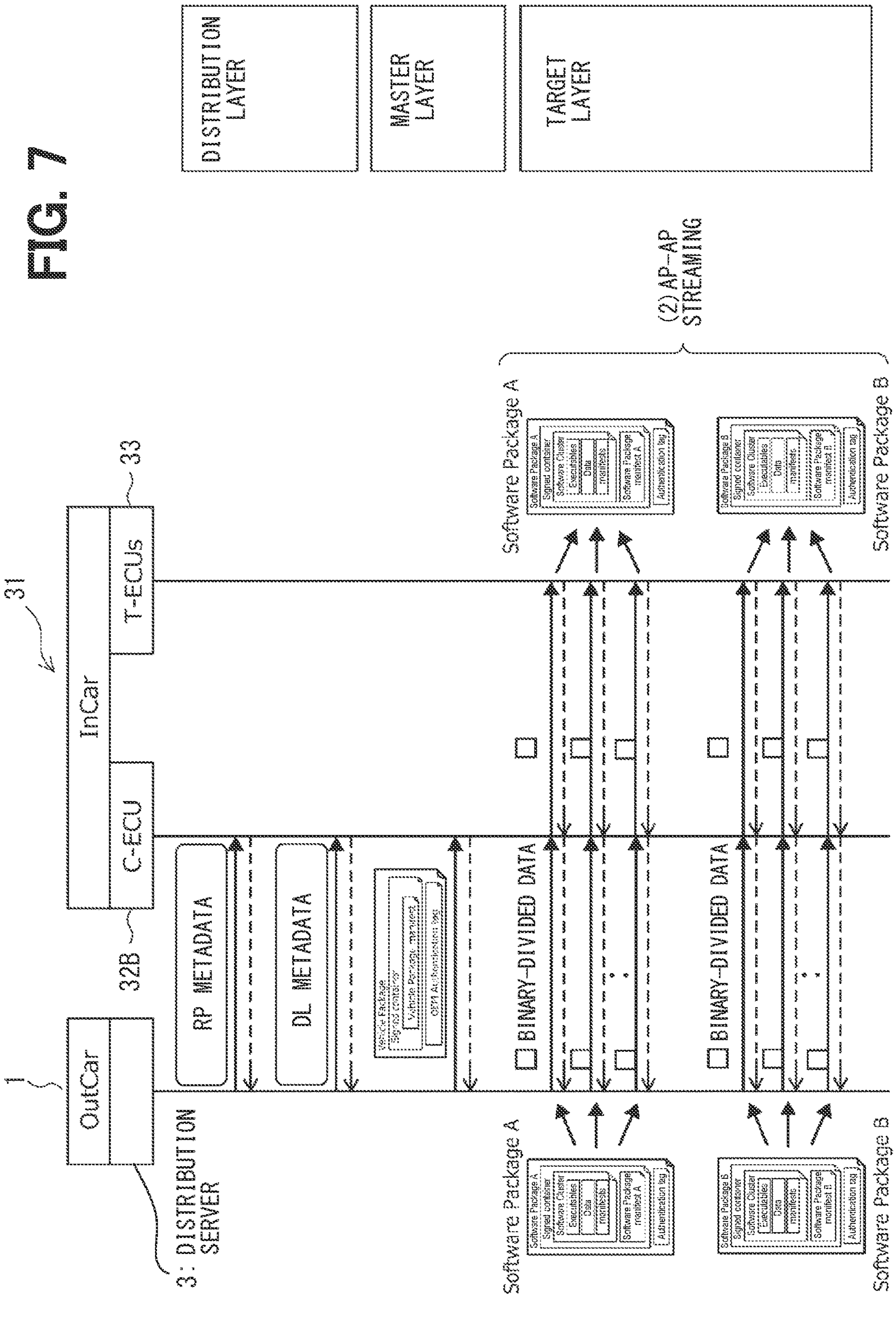
FIG. 7 is a diagram conceptually illustrating a flow of data transfer among the OTA center, a central ECU, and a target ECU.

FIG. 7 schematically illustrates a sequence when the central ECU 32B and the target ECU 33 both conform to AP as the PF type and data packages are streamed.

Figure 8:
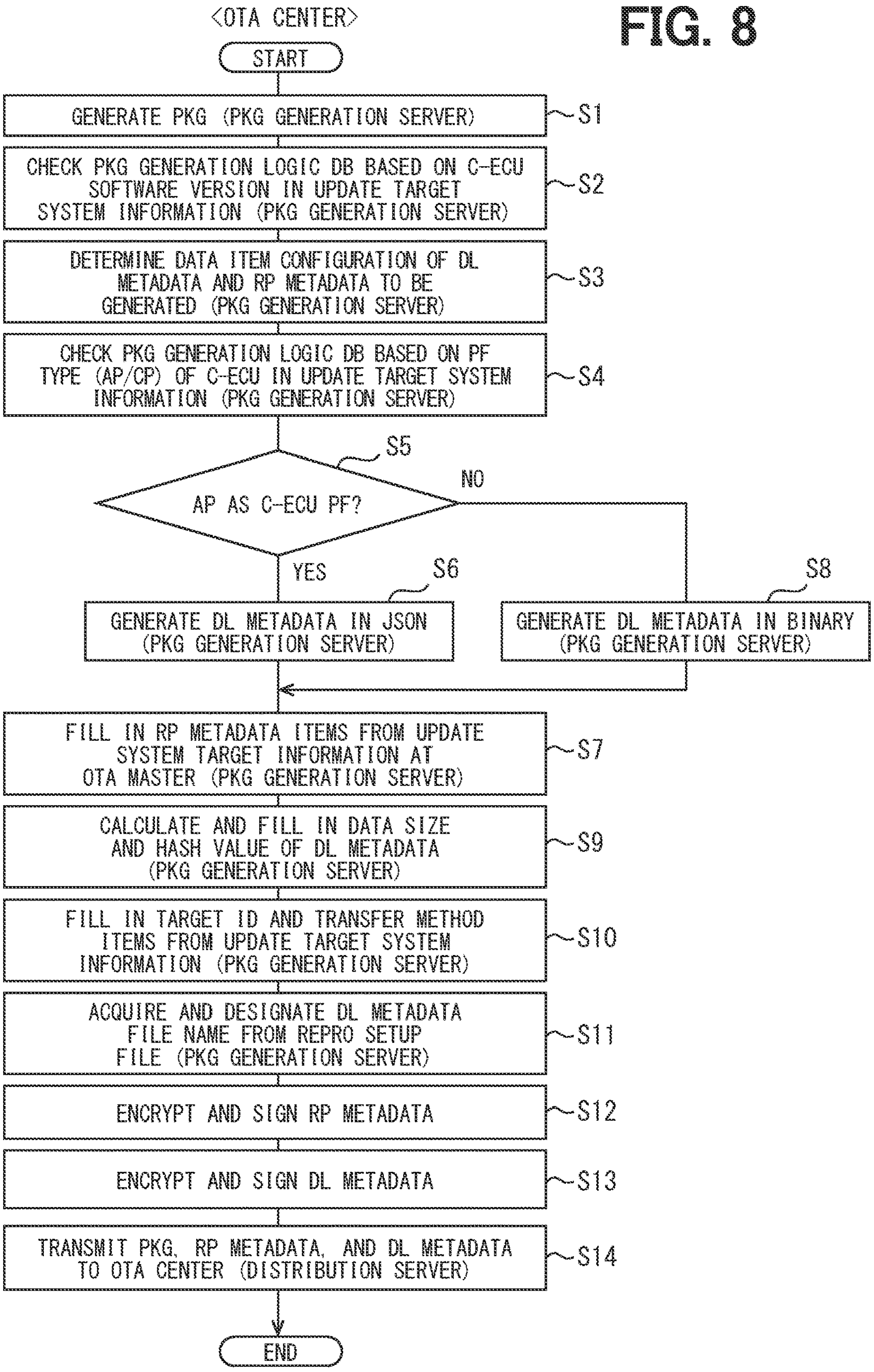
FIG. 8 is a flowchart illustrating a process in the OTA center.

The description below explains the operations of the present embodiment. In the OTA center 1, as illustrated in FIG. 8, the PKG generation server 2 generates a distribution package (51). The PKG generation server 2 confirms the PKG generation logic DB 4 based on the software version of the central ECU 32B in the update target system information (S2). The PKG generation server 2 then determines the configuration of data items in the DL metadata and the RP metadata to be generated (S3). The update target system information includes the ID, software information, and hardware information on the target ECU 33. Based on this information, the PKG generation server 2 can identify the systems to be updated.

The PKG generation server 2 confirms the inside of the PKG generation logic DB 4 based on the PF type (AP/CP) of the central ECU 32B in the update target system information (S4). If the PF type is AP (S5; YES), the PKG generation server 2 generates DL metadata based on JSON (S6) and fills in RP metadata items from the update target system information (S7). If the PF type is CP (S5; NO), the PKG generation server 2 generates DL metadata in binary (S8) and proceeds to step S7.

The PKG generation server 2 allows the calculation portion 10 to calculate the data size and the hash value of DL metadata and fills in the corresponding items (S9). The PKG generation server 2 then fills in items for the target ID and the transfer method from the update target system information (S10). The PKG generation server 2 acquires a DL metadata file name from a reprogramming setup file to settle the DL metadata (S11). The encryption/signature processing portion 8 performs an encryption/signature process on the RP metadata (S12). The encryption/signature processing portion 11 performs an encryption/signature process on the DL metadata (S13). The process then transmits the package body, the RP metadata, and the DL metadata to the distribution server 3 (S14).

Figure 9:
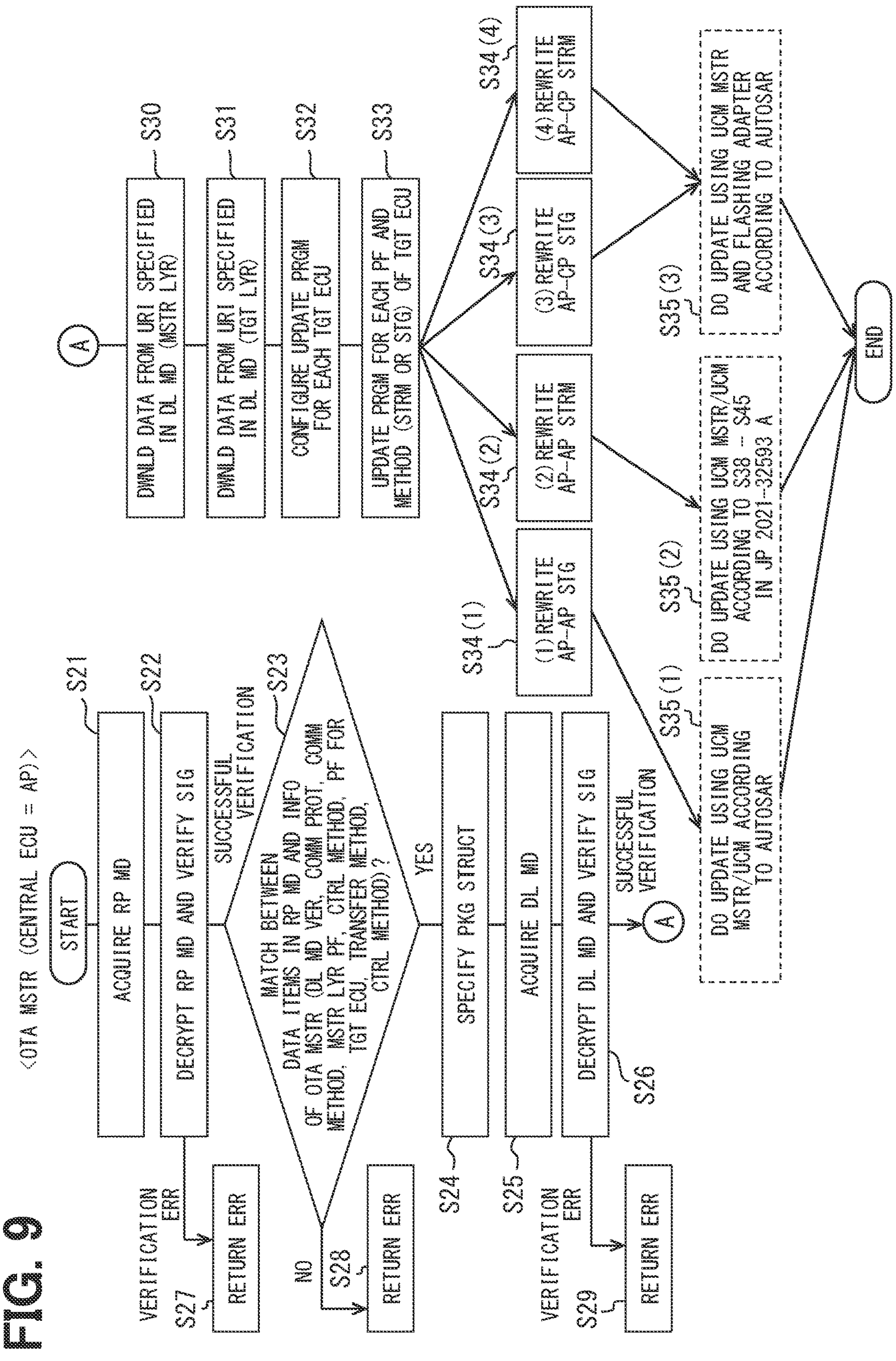
FIG. 9 is a flowchart illustrating a process in the OTA master (central ECU=AP)

FIG. 9 illustrates a process corresponding to AP as the PF type of the central ECU 32B. The OTA master 32 acquires the RP metadata from the OTA center 1 (S21) and then decrypts the RP metadata and verifies its signature (S22). If the verification result causes an error, the OTA master 32 returns error status information to the OTA center 1 (S27). If the verification result is successful, the OTA master 32 checks the RP metadata items to determine whether each item matches the information managed by the OTA master 32 (S23). If a mismatch is found, the OTA master 32 returns error status information to the OTA center 1 similarly to step S27 (S28).

If all items match (YES), the OTA master 32 specifies the package structure based on the RP metadata (S24) and acquires the DL metadata from the OTA center 1 (S25). The OTA master 32 decrypts the DL metadata and verifies its signature (S26). If the verification result causes an error, the OTA master 32 returns error status information to the OTA center 1 (S29). If the verification result is successful, the OTA master 32 downloads data for the master layer and the target layer from the URI specified in the DL metadata (S30, S31).

The OTA master 32 configures an update program for each target ECU 33 (S32) and updates the program (reprogramming) for each platform and OTA method in each package structure of the target ECU 33 (S33). From here, the process branches to steps S34(1) through S34(4). When the central ECU 32B is CP, the process branches to steps S34(5) through S34(8) in FIG. 10.

Step S34(1) applies to rewriting when the combination of central and target ECUs is AP-AP and the target ECU 33 uses the OTA method of storage. In this case, the UCM master/UCM performs an update according to the procedure described in the AUTOSAR Specification (SWS) (S35(1)). Step S34(2) applies to rewriting when the combination thereof is AP-AP and the OTA method is streaming. The process performs steps S38 through S45 in FIG. 13 of Japanese Patent Application No. 2021-32593 (S35(2)). The contents of Japanese Patent Application No. 2021-32593 are incorporated by reference as descriptions of technical elements in this specification.

Step S34(3) applies to rewriting when the combination is AP-CP and the OTA method is storage. In this case, the UCM master and a flushing adapter perform an update according to the procedure described in the AUTOSAR Specification (SWS) (S35(3)). Step S34(4) applies to rewriting when the combination is AP-CP and the OTA method is streaming. In this case also, the process proceeds to step S35(3).

Figure 10:
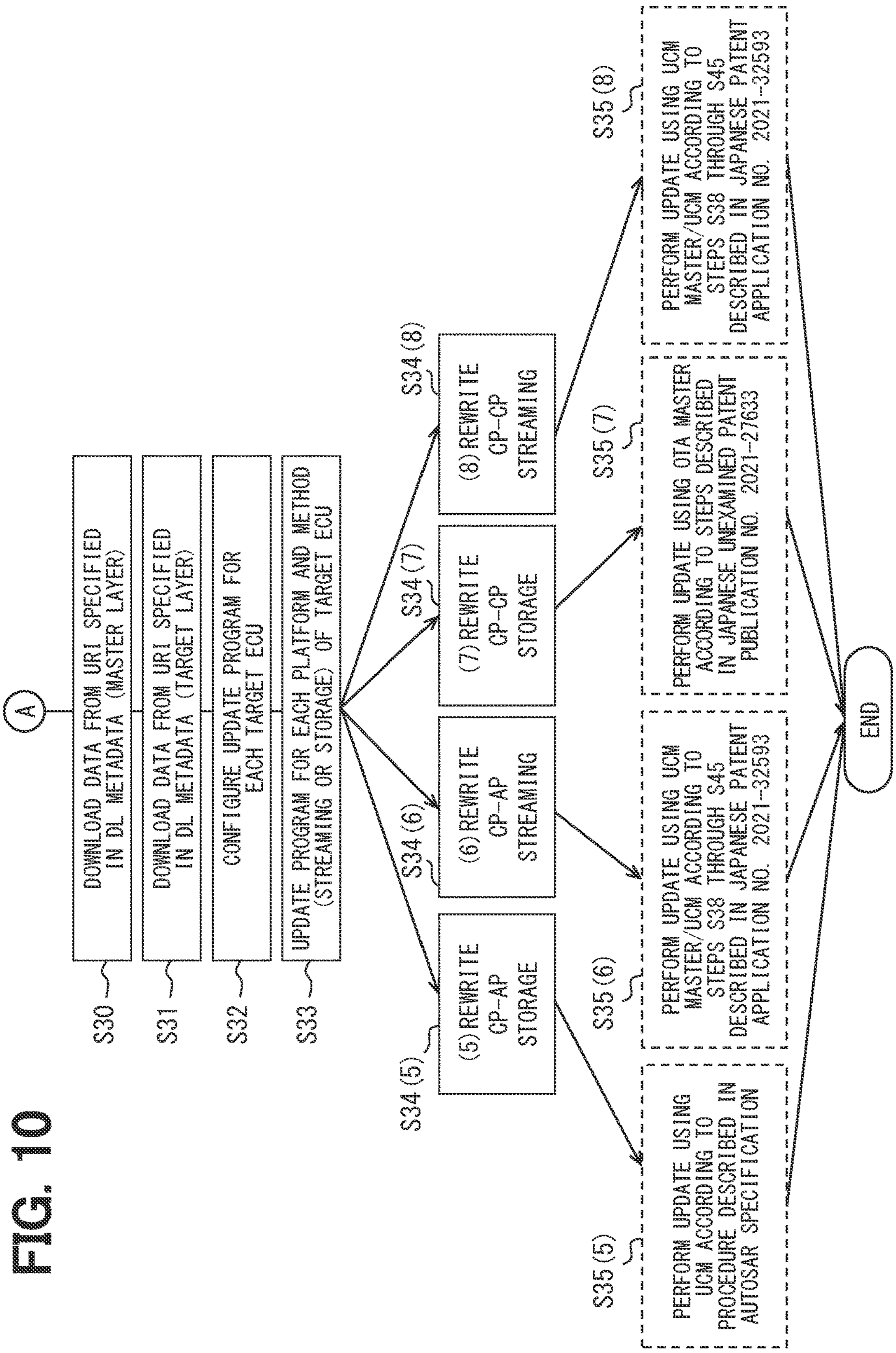
FIG. 10 is a flowchart illustrating a process in the OTA master (central ECU=CP) corresponding to part of FIG. 9.

Step S34(5) as illustrated in FIG. 10 applies to rewriting when the combination is CP-AP, and uses the OTA method of storage. In this case, UCM performs an update according to the procedure described in the AUTOSAR Specification (SWS) (S35(5)). Step S34(6) applies to rewriting when the combination is CP-AP and the OTA method is streaming. The process is similar to step S35(2) (S35(6)).

Step S34(7) applies to rewriting when the combination is CP-CP and the OTA method is storage. In this case, the OTA master performs an update according to the procedure described in paragraphs through and FIGS. 115 through 118 of JP 2020-27633 A (S35(7)). Step S34(8) applies to rewriting when the combination is CP-CP and the OTA method is streaming. The process is similar to step S35(2) (S35(8)). The contents of JP 2020-27633 A are incorporated by reference as descriptions of technical elements in this specification.

According to the present embodiment as above, the OTA center 1 transmits RP metadata to the OTA master 32. The RP metadata provides configuration information on distribution packages. The RP metadata has a three-layer structure composed of a distribution layer to store communication protocols and communication destination information; a master layer to store information on the platform of the OTA master 32; and a target layer to store information on the platform of the target ECU 33.

The OTA master 32 interprets the RP metadata and determines that the distribution package is compatible with the subject vehicle. Then, the OTA master 32 requests the OTA center 1 to supply the DL metadata that stores control information for acquiring the data needed for each of the three layers. OTA center 1 transmits the DL metadata to the OTA master 32. Then, the OTA master 32 interprets the DL metadata, acquires the necessary data, and perform data update control on the target ECU 33.

The RP metadata mainly specifies the contents of a distribution package the OTA center 1 transmits to the OTA master 32. The DL metadata mainly specifies the contents of update data the OTA master 32 transmits to the target ECU 33. The metadata is organized into a three-layer structure of distribution, master, and target. It is possible to flexibly define transfer methods, platform types, and distribution package types, regardless of a possible increase therein, and update data on the target ECU 33.

Specifically, the RP metadata includes master layer parameters such as platform type information on the OTA master 32 and control method type information on the platform. Target layer parameters include type information on the platform of the target ECU 33, type information on the platform control method, and type information on the data transfer method from the OTA center 1 to the target ECU 33. The OTA master 32 compares the above-described information with the design configuration information managed in the OTA master 32 to determine whether the distribution package is compatible with the subject vehicle.

The above-described type information is included in the master and target layer parameters of the RP metadata. The OTA master 32 can interpret these pieces of type information and transfer data to the target ECU 33.

The DL metadata includes parameters for each layer such as the URI of the data acquisition destination, the hash value given to the data, the ID of the target ECU 33, and type information on the data transfer method from the OTA center 1. Parameters in the master layer and the target layer include type information on platforms of the OTA master 32 and the target ECU 33. Based on each piece of the information, the OTA master 32 acquires data needed for each layer at the required timing and controls the data update for the target ECU 33. The above-described information is included in the parameters of the DL metadata for each layer. The OTA master 32 can interpret the information and transfer data to the target ECU 33 based on more specific procedures.

Second Embodiment

Figure 11:
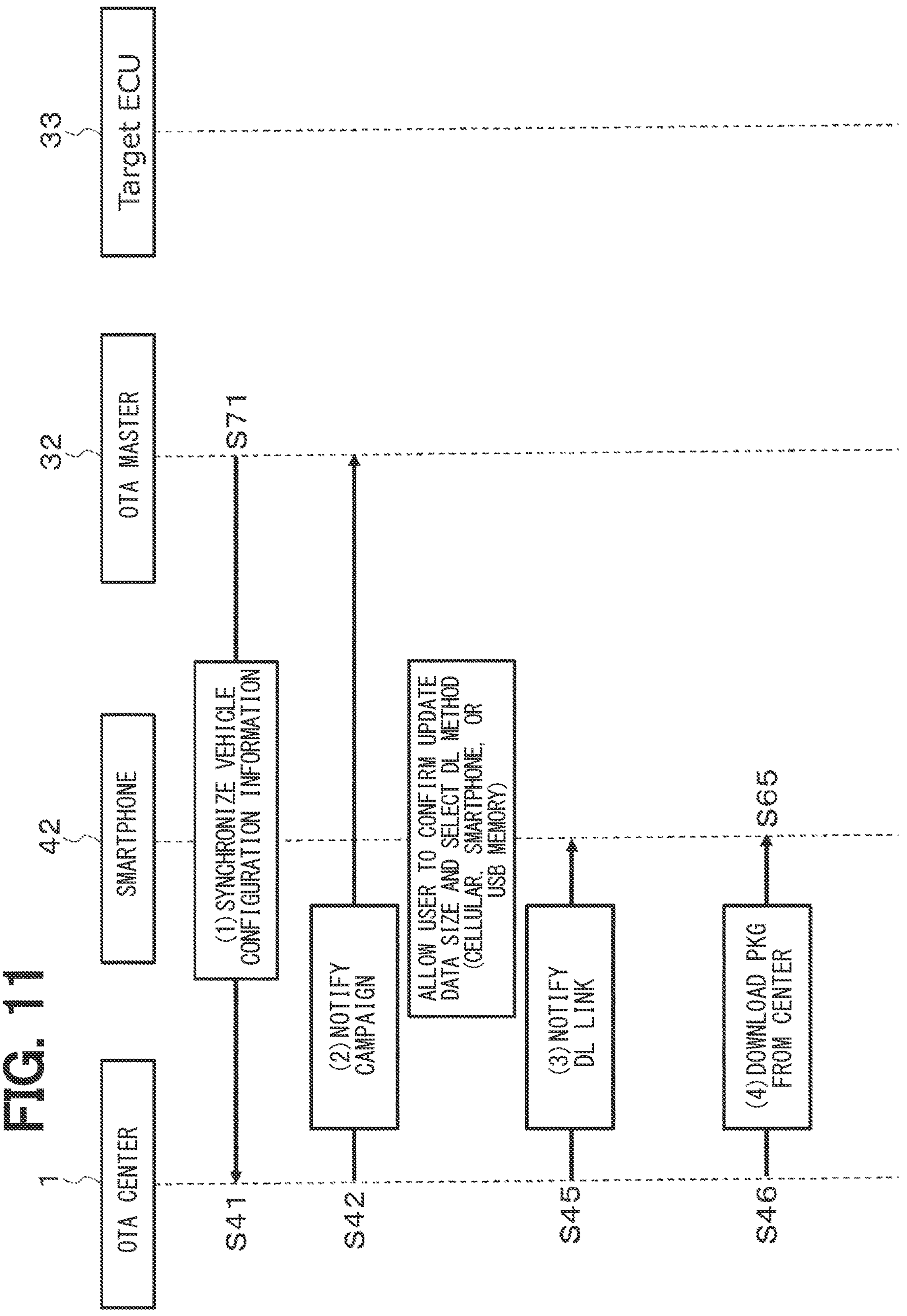
FIG. 11 is a sequence diagram (part 1) illustrating a process of using a smartphone to transfer a distribution package according to a second embodiment.
Figure 12:
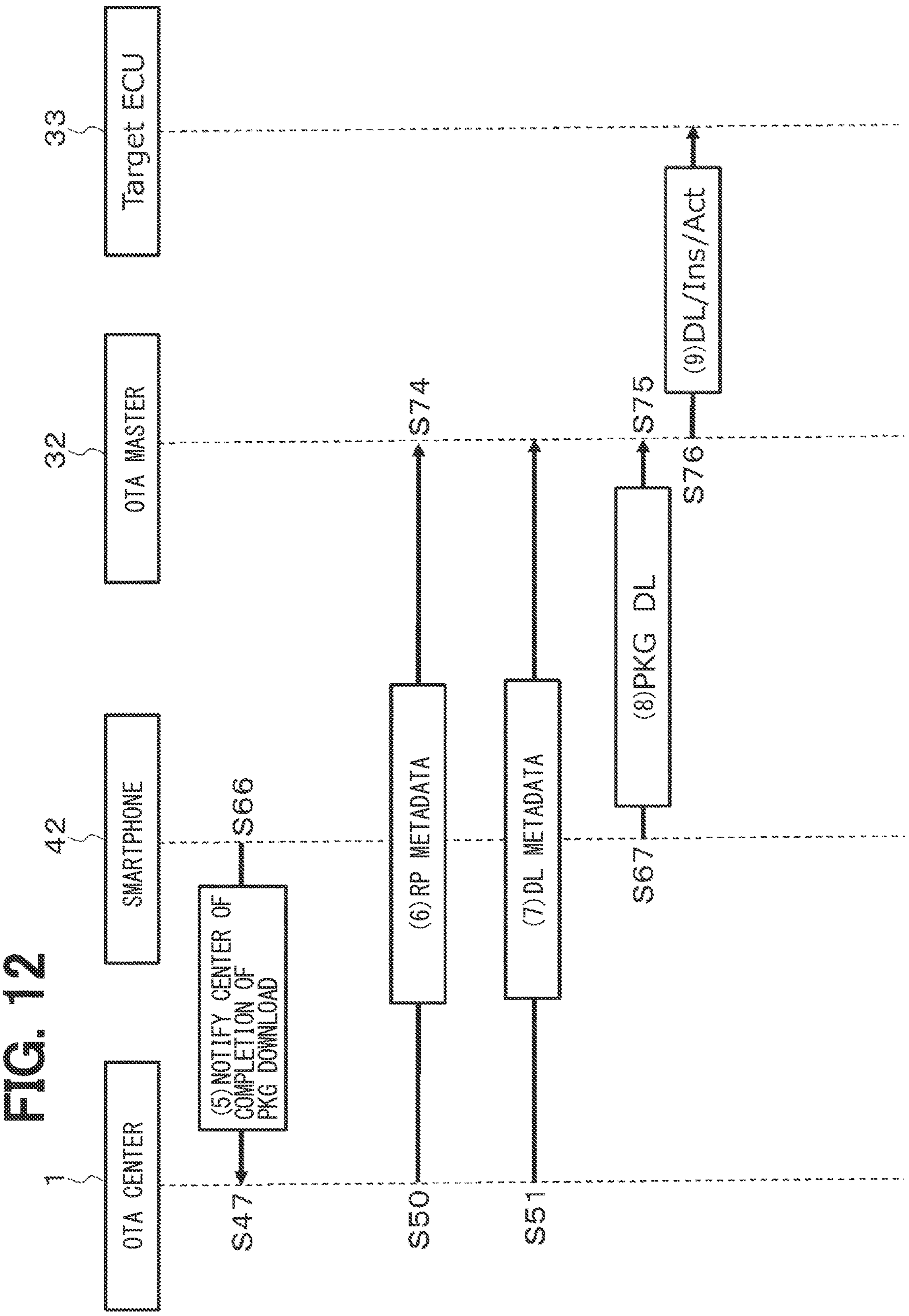
FIG. 12 is a sequence diagram (part 2) illustrating the process of using a smartphone to transfer a distribution package.

The mutually corresponding parts in the second and first embodiments are designated by the same reference numerals and a detailed description is omitted for simplicity. As illustrated in FIGS. 11 and 12, the second embodiment uses a smartphone 42 to transfer distribution packages. The smartphone 42 is paired and communicates with an in-vehicle device such as a car navigation system or the DCM 32A, for example. The smartphone 42 can communicate with the OTA master 32 via these devices. The smartphone 42 may be replaced by a personal computer (PC). The smartphone may be denoted as a "smartphone."

Figure 13:
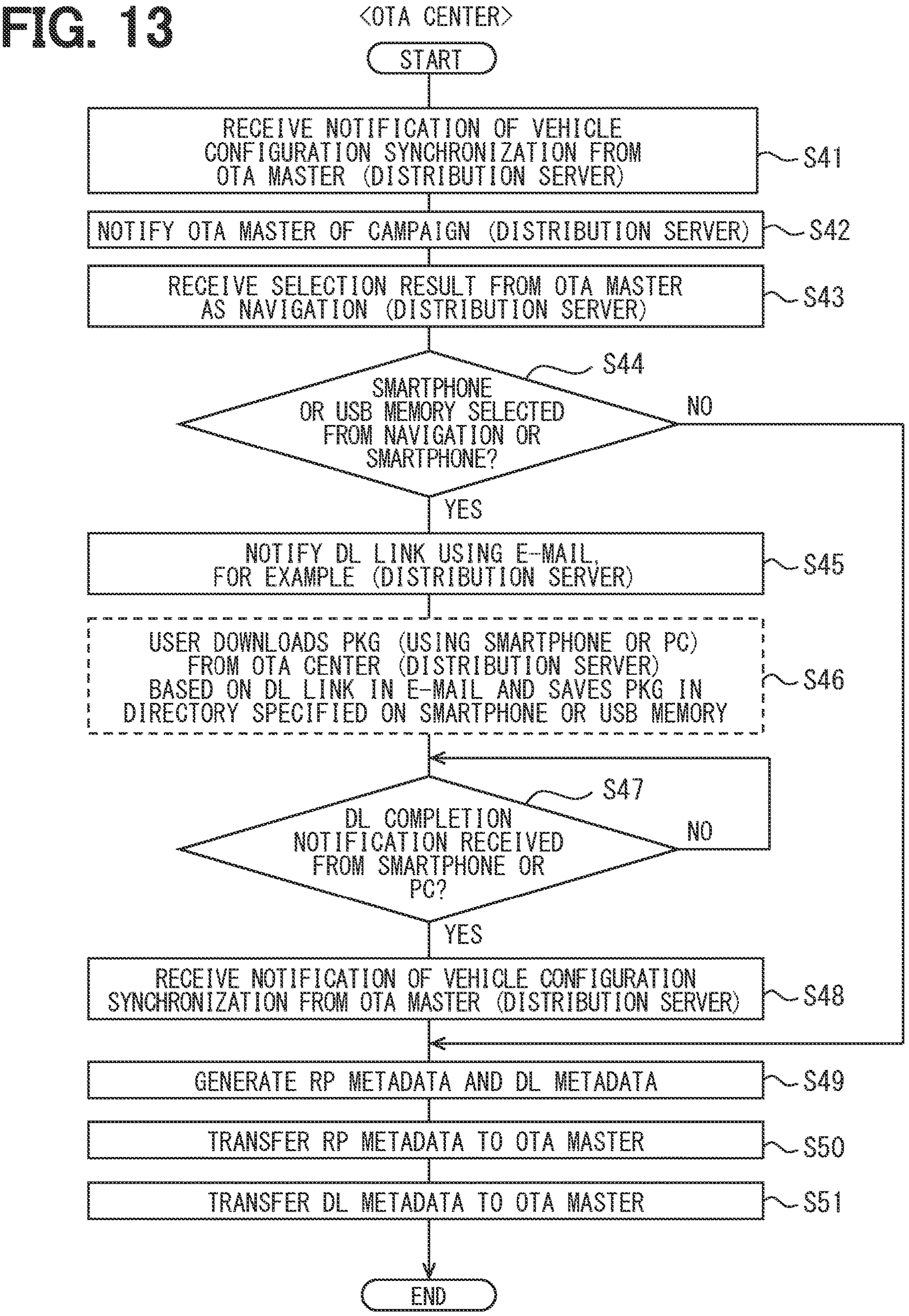
FIG. 13 is a flowchart illustrating a process on the OTA center.

In FIG. 13, the distribution server 3 of the OTA center 1 receives a notification to synchronize the vehicle configuration information from the OTA master 32 (S41). The distribution server 3 then notifies the OTA master 32 of campaign information (S42). The vehicle configuration information provides identification information on the hardware and the software of the ECU installed in the vehicle. The vehicle configuration information also includes identification information on a system configuration composed of multiple ECUs and a vehicle configuration composed of multiple systems. The "notification for synchronization" ensures a coincidence between the contents of the configuration information maintained in the vehicle and the contents of the configuration information maintained in the OTA center 1. In other words, the notification is performed for synchronization. The campaign information relates to program updates to be displayed on the vehicle-side system 3 or the smartphone 42.

The user references the campaign information displayed on the smartphone 42, checks the update data size, and then selects a download destination for the distribution package. The download destination is a mobile storage terminal such as a USB memory device connected to "cellular" signifying the OTA master 32, the smartphone 42, or the car navigation system. The distribution server 3 receives the selection result (S43) and the smartphone 42 or the USB memory may be selected (S44; YES). In this case, the distribution server 3 uses e-mail, for example, to notify the smartphone 42 of the download destination link information (S45).

The user downloads the distribution package from the distribution server 3 based on the above-described notification and saves the distribution package in the directory specified on the smartphone 42 or the USB memory (S46). Thereafter, a download completion notification may be received from smartphone 42 (S47; YES). Then, the distribution server 3 receives the "notification for synchronization" again from the OTA master 32 (S48) similar to step S41. The PKG generation server 2 generates RP metadata and DL metadata as illustrated in the first embodiment (S49). Then, the distribution server 3 transmits each metadata to the OTA master 32 (S50, S51).

Figure 14:
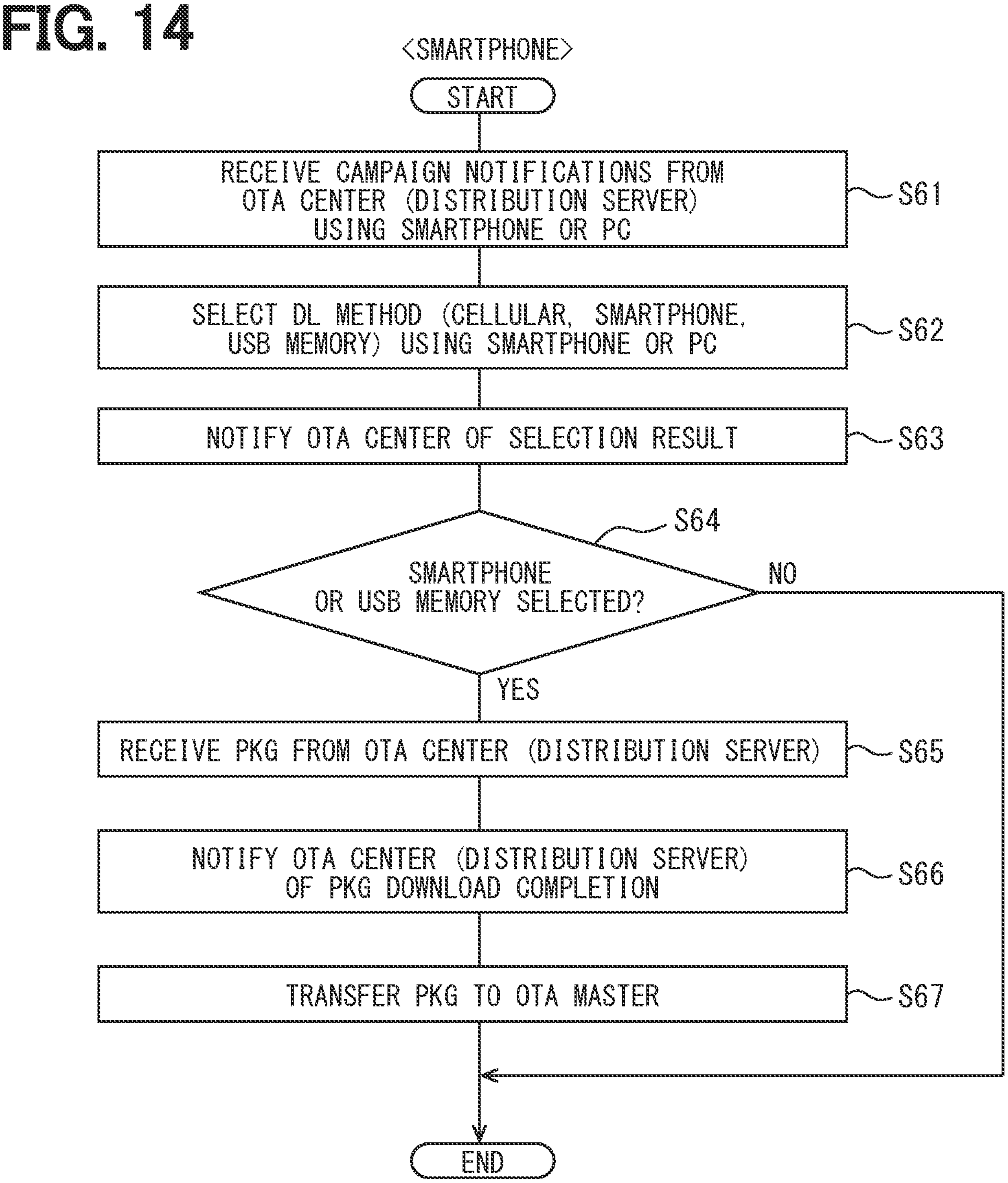
FIG. 14 is a flowchart illustrating a process in the smartphone.

As illustrated in FIG. 14, the smartphone 42 receives the notification of the campaign information from the OTA center 1 (S61). The user then selects a download destination of the distribution package (S62) and notifies the OTA center 1 of the selection result (S63). If the smartphone 42 or the USB memory is selected (S64; YES), the smartphone 42 receives the distribution package from the distribution server 3 (S65). A download completion notification is transmitted to the OTA center 1 (S66) and the distribution package is transferred to the OTA master 32 (S67).

Figure 15:
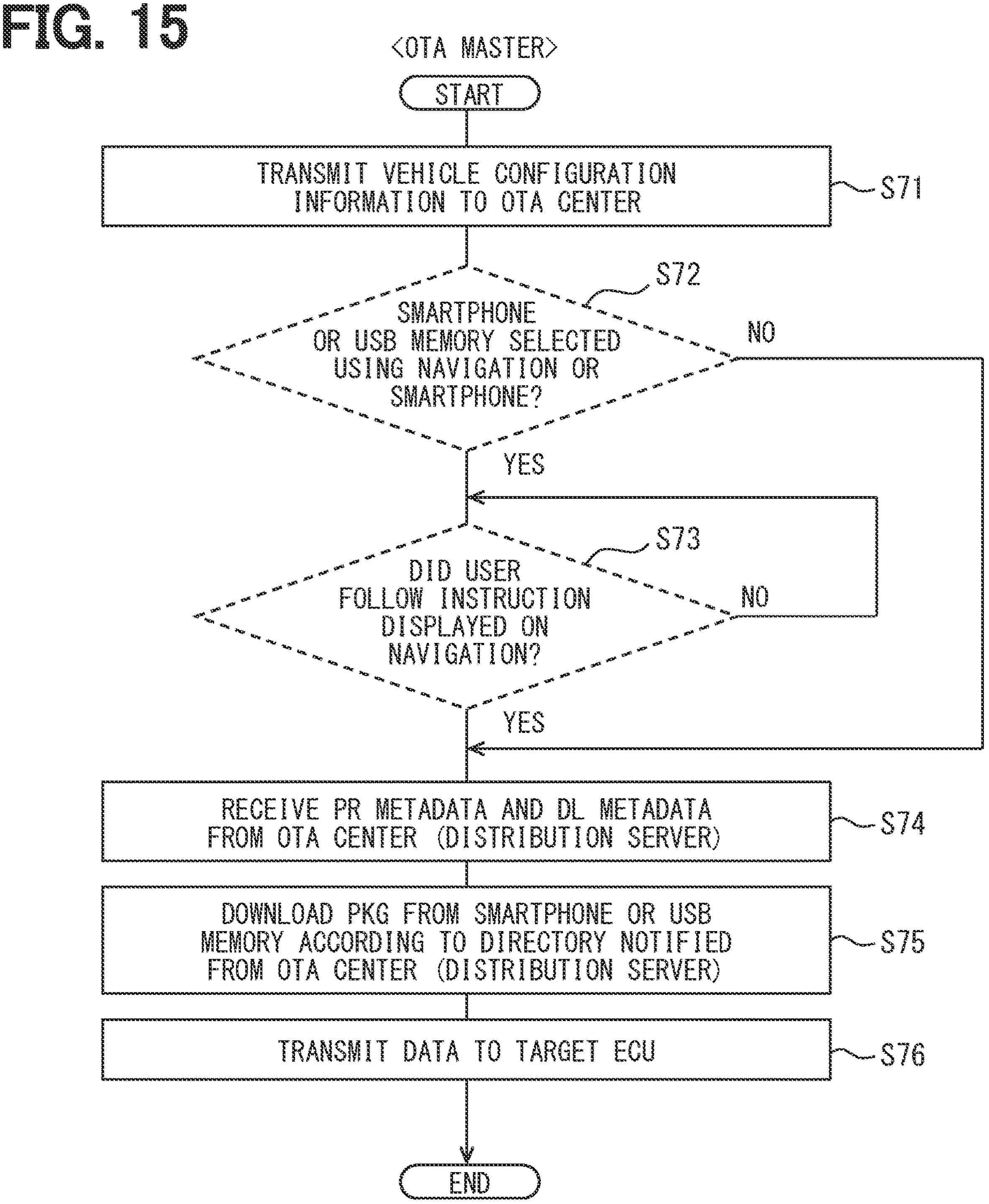
FIG. 15 is a flowchart illustrating a process on the OTA master.

As illustrated in FIG. 15, the OTA master 32 transmits vehicle configuration information to the OTA center 1 (S71). The user selects the smartphone 42 or the USB memory as the download destination of the distribution package (S72; YES), and performs instructions displayed on the car navigation system (S73; YES). Then, the OTA master 32 receives the RP metadata and the DL metadata from the OTA center 1 (S74). The OTA master 32 downloads the distribution package from the smartphone 42 or the USB memory according to the directory notified from the OTA center 1 (S75). The OTA master 32 transfers the update data included in the distribution package to the target ECU 33 (S76).

According to the second embodiment as above, the OTA center 1 notifies the smartphone 42 of the information on update data. The user uses the smartphone 42 to specify the destination of the update data to the smartphone 42 or the USB memory. The OTA center 1 transmits the update data to the smartphone 42 or the USB memory. The OTA center 1 stores communication destination information in the smartphone 42 or the USB memory and successively transmits the RP metadata and the DL metadata to the OTA master 32. The OTA master 32 receives the distribution package from the smartphone 42 or the USB memory according to the communication destination information.

As above, the OTA master 32 can receive the distribution package transmitted from the OTA center 1 via the smartphone 42 or the USB memory and can transfer the update data to the target ECU 33. It is possible to more flexibly update the data in the target ECU 33.

Third Embodiment

Figure 16A:
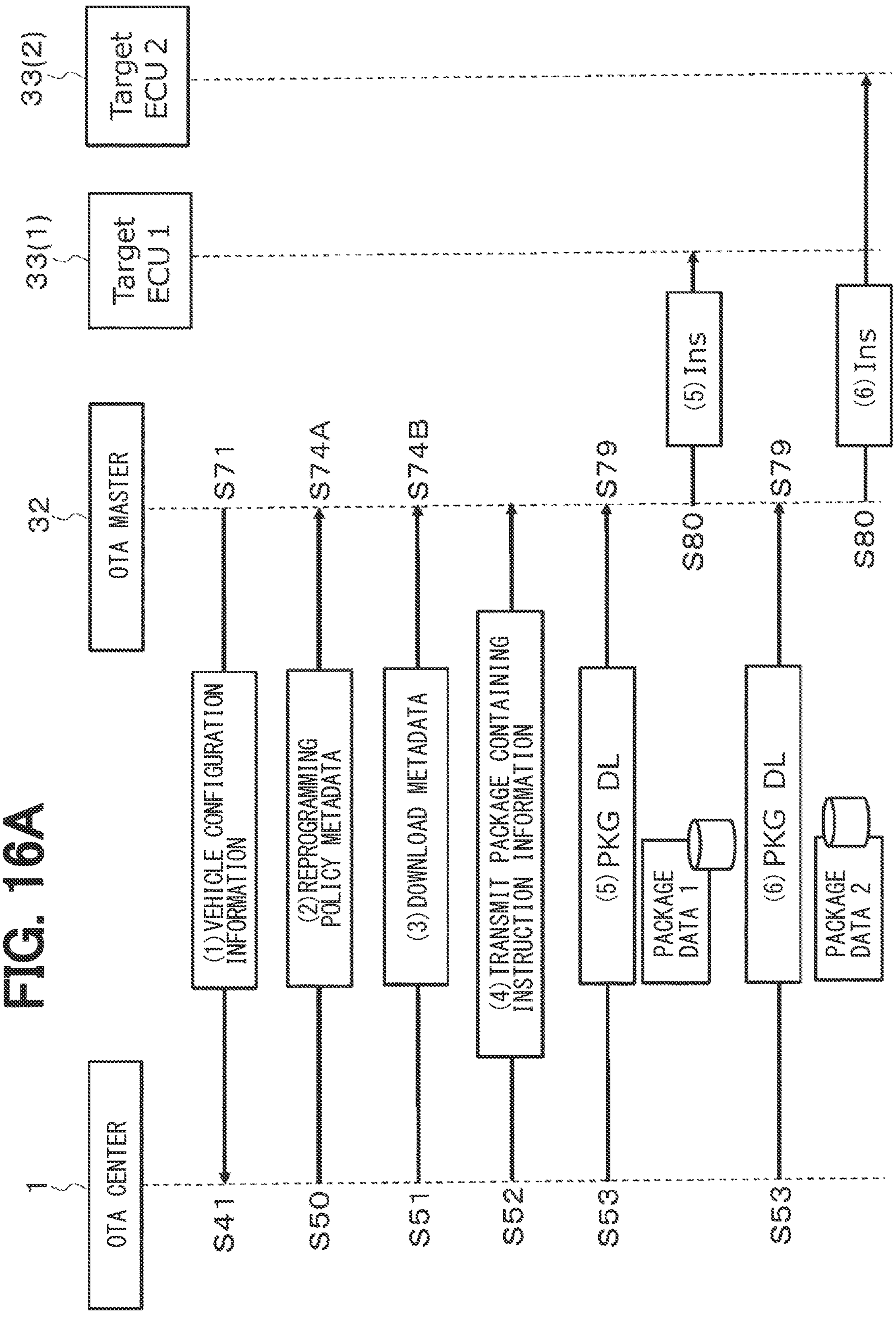
FIG. 16A is a sequence diagram illustrating processes among the OTA center, the OTA master, and the target ECU according to a third embodiment.
Figure 16B:
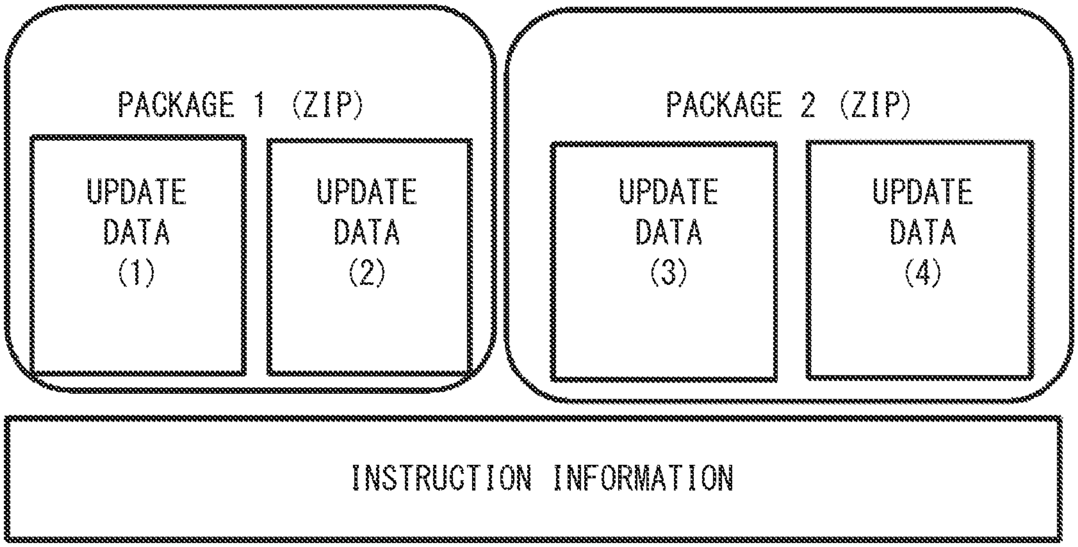
FIG. 16B is a diagram illustrating a distribution package divided into multiple zip files.

Conventionally, update data is distributed to multiple target ECUs based on the storage method by archiving multiple packages corresponding to the target ECUs in one zip file. As illustrated in FIG. 16A and FIG. 16B, the third embodiment distributes update data to the multiple target ECUs 33 based on the storage method by dividing the distribution package into multiple zip files. For example, suppose update data (1) and (2) correspond to the target ECU 33(1) and update data (3) and (4) correspond to the target ECU 33(2). In this case, suppose update data (1) and (2) are archived in zip-file package 1 and update data (3) and (4) are archived in zip-file package 2. Prior to the distribution of packages 1 and 2, instruction information is transmitted to the OTA master 32. The instruction information indicates that these two packages contain data to be updated simultaneously.

Suppose information on the master layer for download metadata is comparable to one set (such as URI, data name, or data size). Then, the storage method distributes update data to multiple target ECUs by writing multiple sets of the information on the master layer for download metadata. In other words, this information is written in as many pieces as the target ECUs. Null or blank is set to the target layer.

Figure 17:
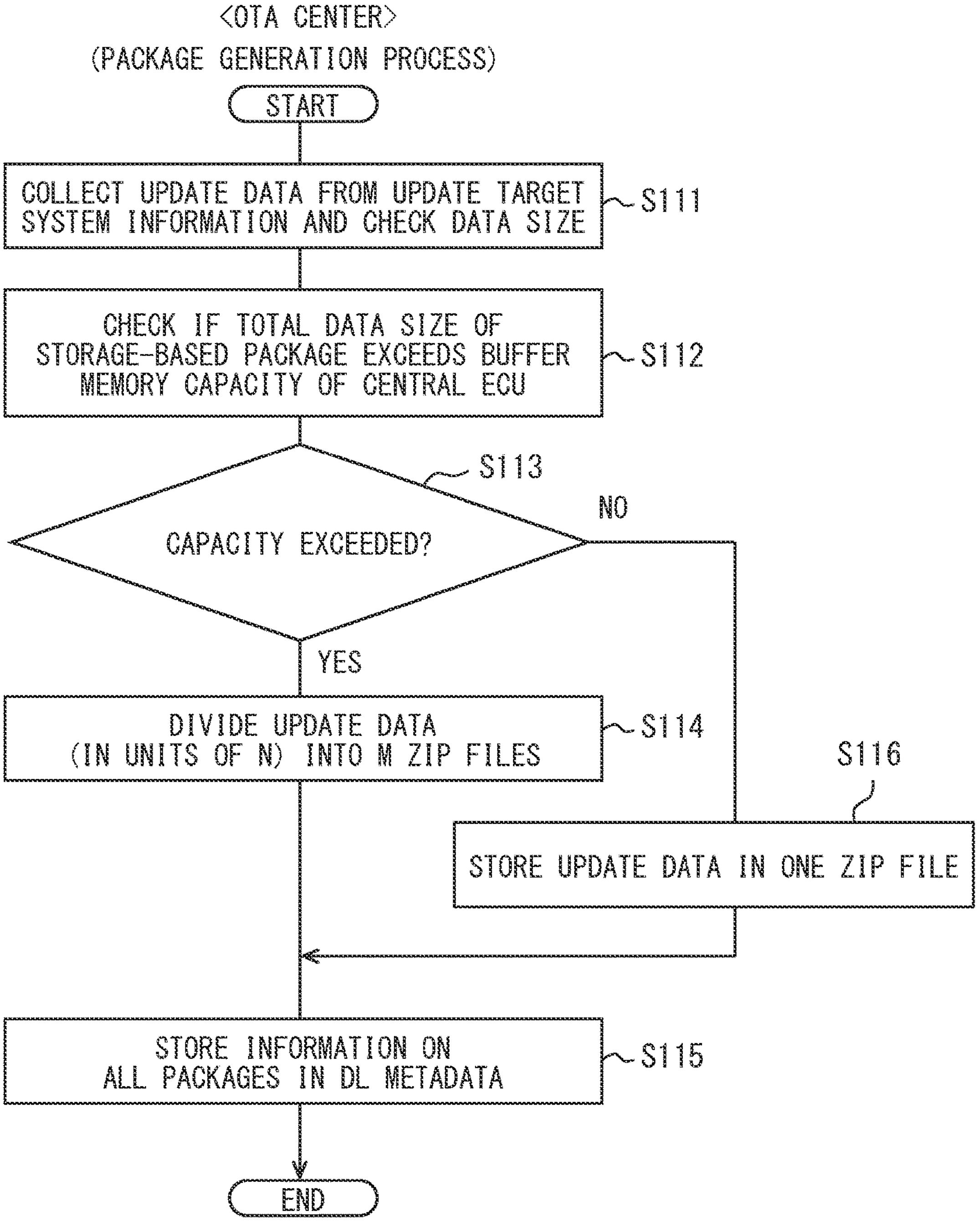
FIG. 17 is a flowchart illustrating a package generation process in the OTA center.

As illustrated in FIG. 17, the OTA center 1 collects update data from the update target system information and confirms the data size (S111). The process checks whether the total data size of the distribution package based on the storage method exceeds the buffer memory capacity of the central ECU 32B (S112). If the capacity is not exceeded (NO), the update data is stored in one zip file (S116). If the capacity is exceeded (YES), the update data is divided into units of N and is stored in M zip files (S114). Then, the information on all the packages is stored in the DL metadata. The distribution package is generated as above.

Figure 18:
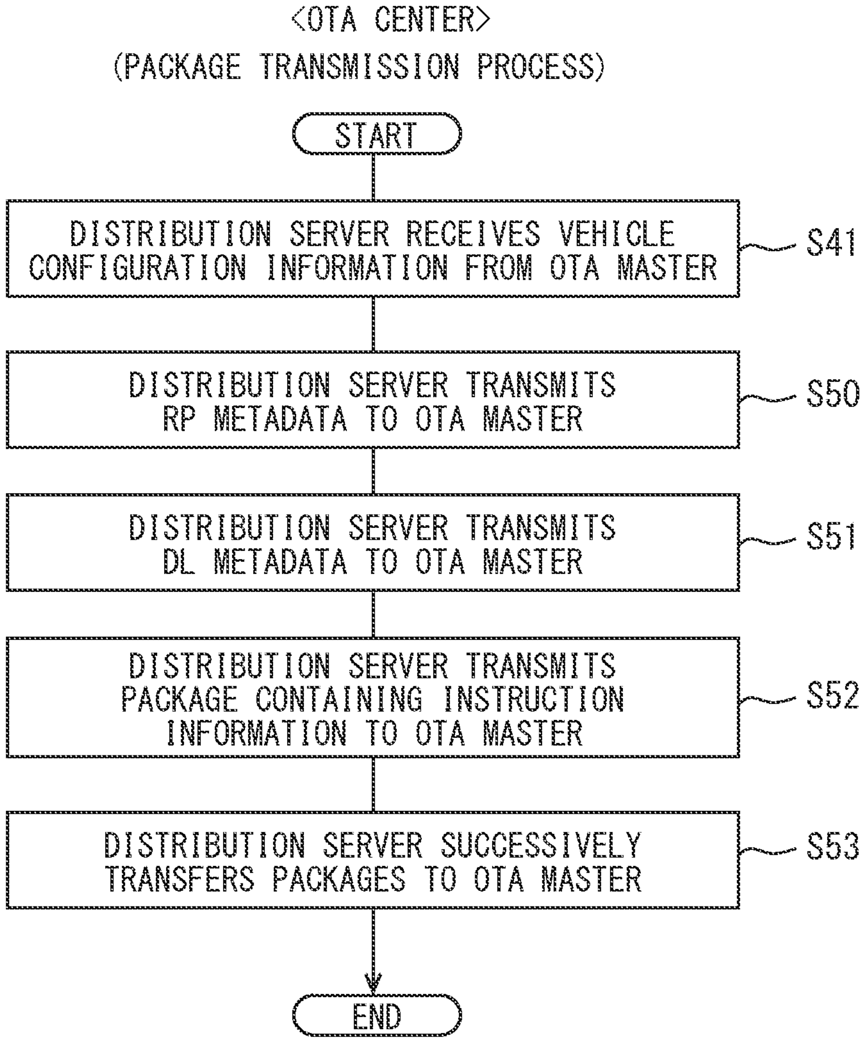
FIG. 18 is a flowchart illustrating a package transmission process in the OTA center.

As illustrated in FIG. 18, the OTA center 1 performs steps S41, S50, and S51. The distribution server 2 then transmits the package containing the above-described instruction information to the OTA master 32 (S52). Packages 1 and 2 are successively transmitted to the OTA master 32 (S53).

Figure 19:
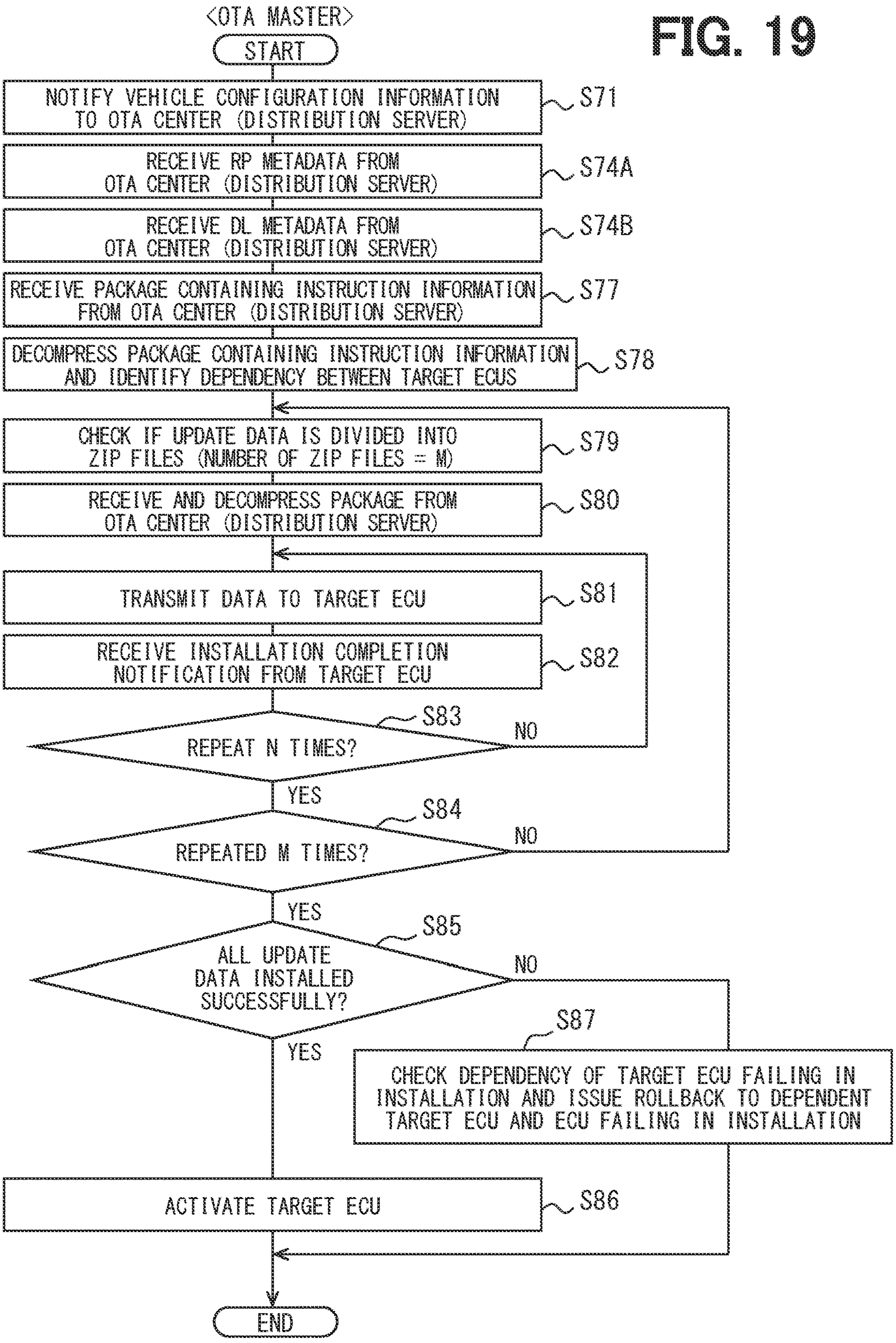
FIG. 19 is a flowchart illustrating a process on the OTA master.

As illustrated in FIG. 19, the OTA master 32 performs steps S71 and S74 (A, B), and receives the package containing the instruction information from the distribution server 2 (S77). The OTA master 32 decompresses the package and identifies the dependency regarding data updates on the target ECUs 33(1) and 33(2) (S78). The OTA master 32 determines whether the update data is divided into multiple zip files (S79) and then receives the distribution package from the OTA center 1 and decompresses it (S80). The OTA master 32 transfers the update data included therein to the corresponding target ECU 33 (S81).

The OTA master receives installation completion notifications from all target ECUs 33 (S82, S83; YES, S84; YES). If the installation is successful (S85; YES), the OTA master instructs the target ECU 33 to execute activation (S86). If the installation is unsuccessful (S85; NO), the OTA master issues a rollback to be performed on the failed target ECU 33 and the target ECU 33 dependent on that ECU 33 (S87).

According to the third embodiment as above, the OTA center 1 distributes update data to the OTA master 32 and the target ECU 33 based on the storage method by dividing corresponding multiple distribution packages into multiple zip files. This makes it possible to decompress the received zip files and successively advance the process.

Fourth Embodiment

Conventionally, the entire update data transmitted from the OTA center to the vehicle is encrypted and signed. For example, suppose the data size is 2 GB. The signature verification cannot be performed until 2 GB of data is completely downloaded. However, depending on the contents, data transmitted from the OTA center does not necessarily require the encryption or the signature. Processing efficiency can be improved by applying the encryption and the signature to only important data such as billing-related data in the update data.

As illustrated in FIG. 20, the fourth embodiment provides the master layer and the target layer of DL metadata with information items related to encryption and digital signatures.

Encryption type information:
(common key) AES (Advanced Encryption Standard),
Triple-DES (Data Encryption Standard),
(public key) RSA (Rivest-Shamir-Adleman cryptosystem),
ECC (Elliptic Curve Cryptography)
Signature type information:
(common key) CBC-MAC, (Message Authentication Code), CMAC (Common MAC),
(public key) DSA (Digital Signature Algorithm),
ECDSA (Elliptic Curve DSA)
Key ID information: Used to identify the key
Encryption mode type information: Enc (Encrypt) then MAC,
MAC then, ENC (may be Encrypt-then-MAC, MAC-then-Encrypt, and Encrypt-and-MAC)
Protection target information: Specify a specific file or data
Protected area specification information: Specify all or part of the above-described file
Offset size information: Specify the order of byte from the beginning to start protecting subsequent bytes
Protected data size information: Specify how many bytes to protect
Using the information items above, the OTA center 1 and OTA master 32 apply the encryption and the signature to some files or data in the distribution package and further apply the encryption and the signature to part of the file or data.

Figure 21:
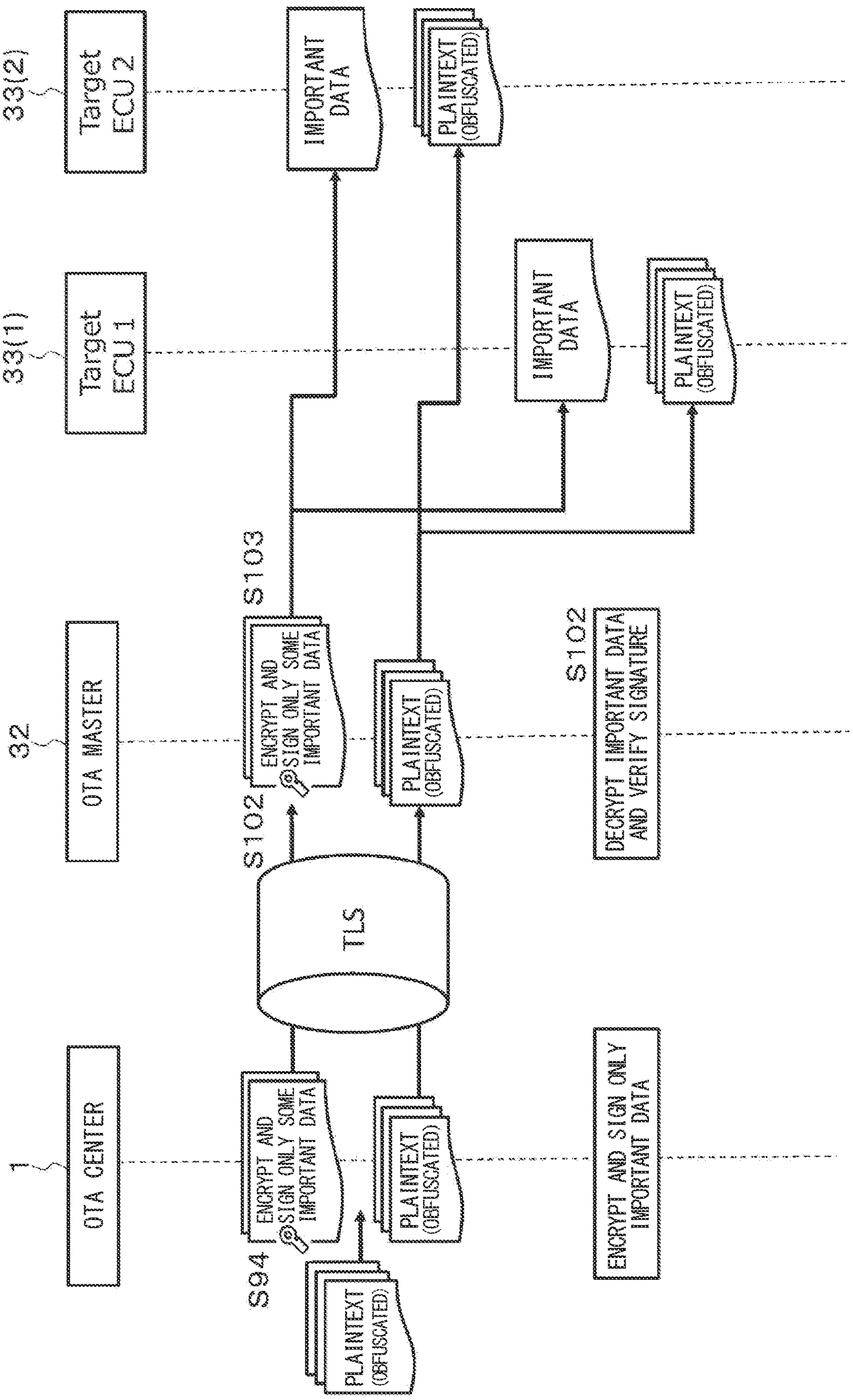
FIG. 21 is a sequence diagram illustrating processes among the OTA center, the OTA master, and the target ECU.
Figure 22:
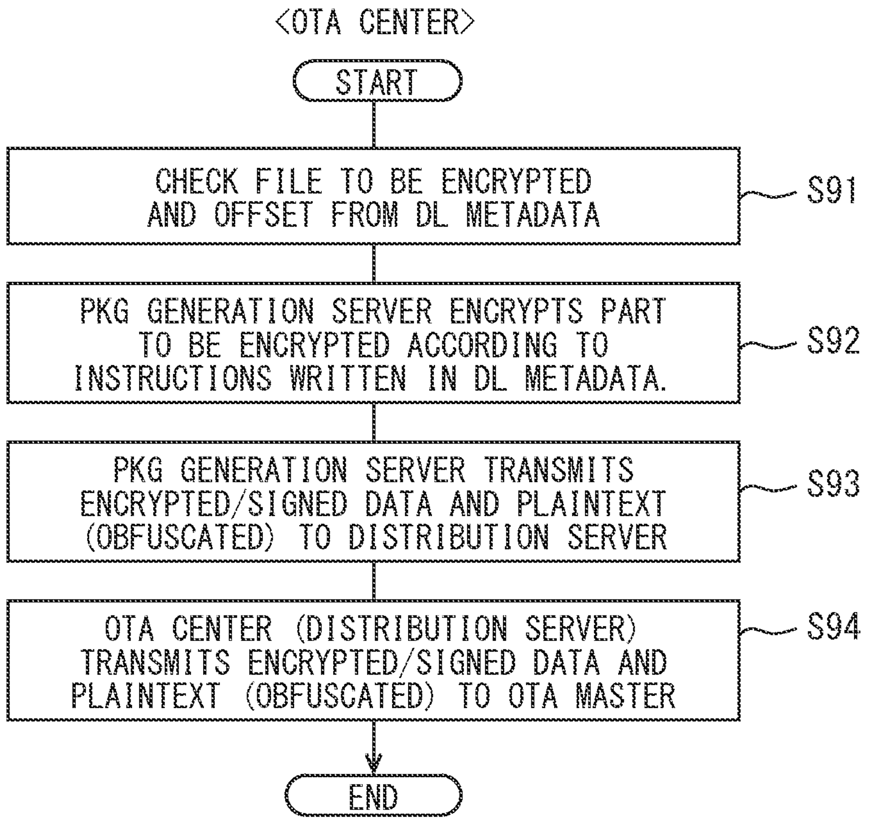
FIG. 22 is a flowchart illustrating a process on the OTA center.

The description below explains the operations of the fourth embodiment. As illustrated in FIGS. 21 and 22, the PKG generation server 2 of the OTA center 1 references the DL metadata of the target update data and confirms a file specified for the encryption and the offset size of that file (S91). The part targeted at encryption is encrypted and a digital signature is given according to each piece of information written in the DL metadata (S92). Data other than the encrypted data is referred to as "plaintext" which is "obfuscated" through the use of a tool such as ProGuard or DashO.

The PKG generation server 2 transfers the encrypted and signed data and the obfuscated plaintext to the distribution server 3 (S93). The distribution server 3 transmits these data to the OTA master 32 (S94). FIG. 21 illustrates that TLS (Transport Layer Security) encrypts the communication between the OTA center 1 and the OTA master 32.

Figure 23:
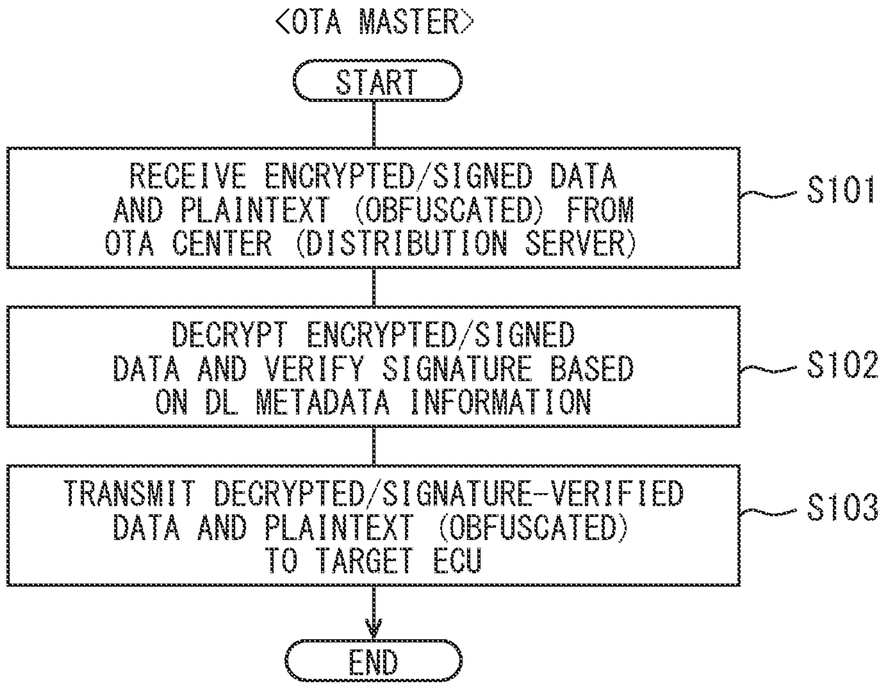
FIG. 23 is a flowchart illustrating a process on the OTA master.

As illustrated in FIG. 23, the OTA master 32 receives the above-described data from the OTA center 1 (S101), decrypts the encrypted and signed data and verifies the signature thereof based on the information in the DL metadata (S102). The OTA master 32 transfers the decrypted and signature-verified update data to the target ECU 33 (S103).

Figure 24:
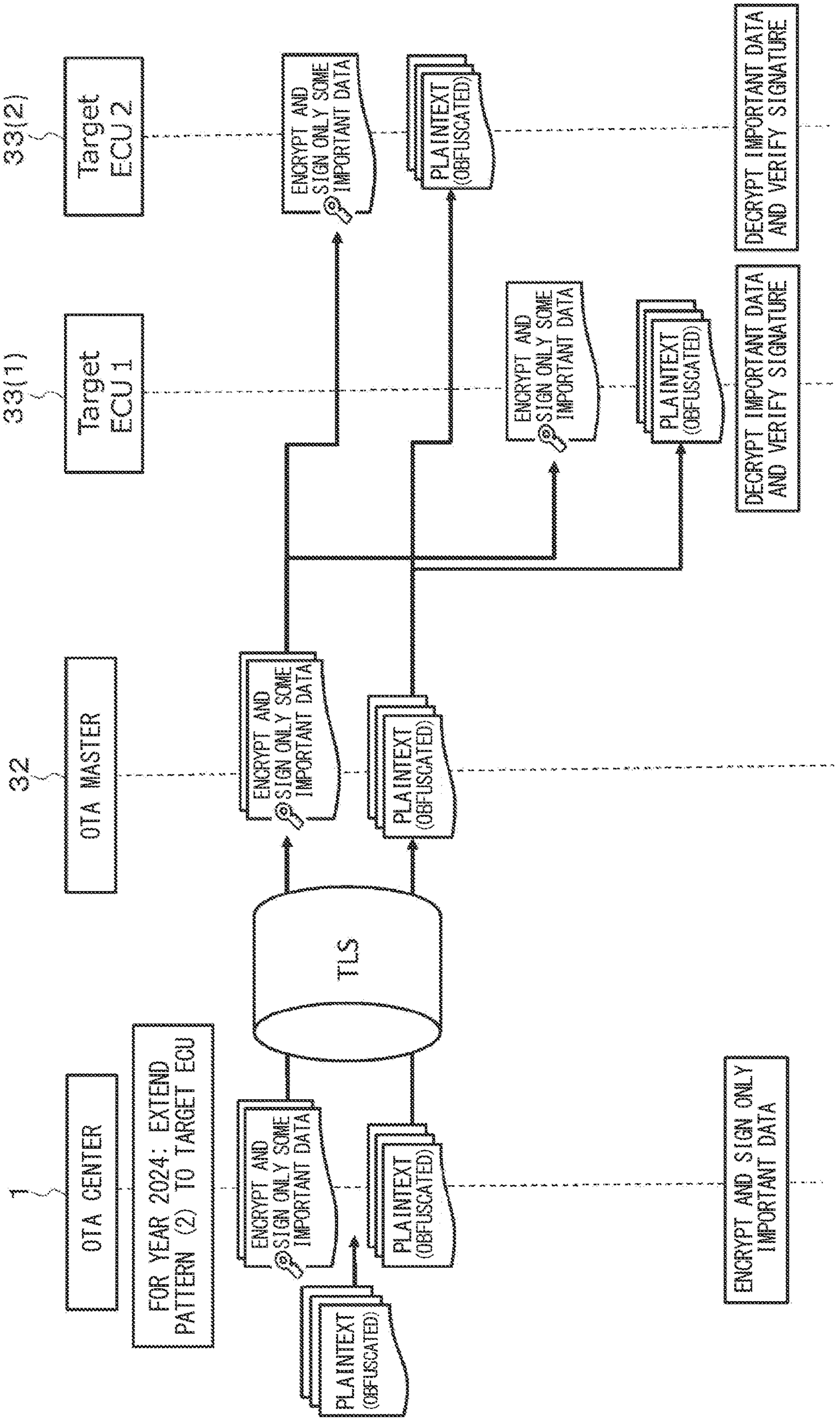
FIG. 24 is a diagram illustrating a modification of the sequence illustrated in FIG. 20.

FIG. 24 is a modification of the above. In this example, the OTA master 32 directly transfers the encrypted and signed data to the target ECU 33. The target ECU 33 decrypts the encrypted and signed data and verifies the signature.

According to the fourth embodiment as above, the transmitting side encrypts and signs only some files or data in the distribution package transmitted from the OTA center 1 to the OTA master 32. The receiving side decrypts the files or data and verifies the signature thereof. It is possible to reduce the time required for processing such as encryption and decryption.

Fifth Embodiment

Figure 26:
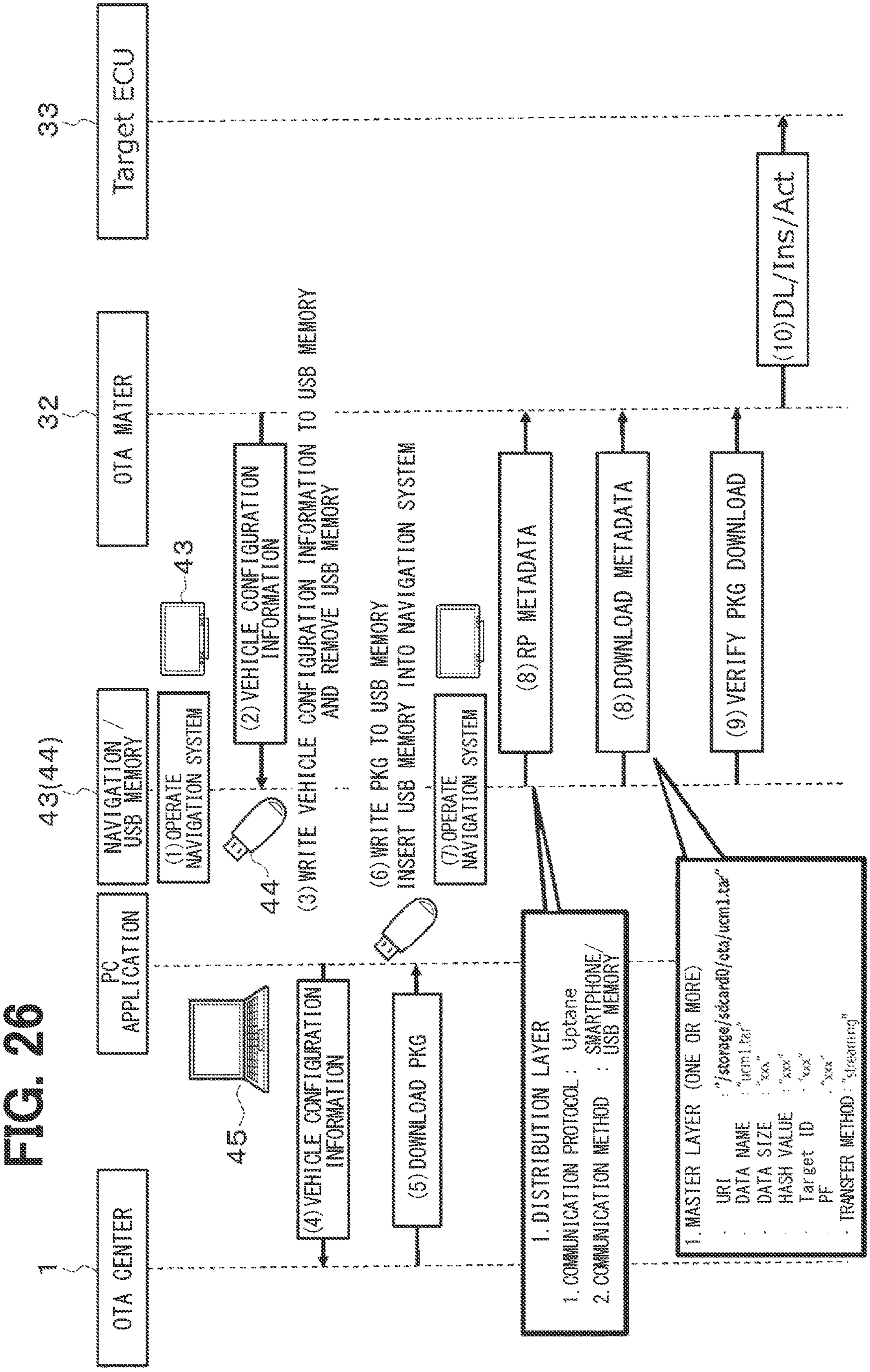
FIG. 26 is a sequence diagram illustrating processes among the OTA center, the OTA master, and the target ECU through the use of a PC application, a navigation system, and USB memory.

According to the fifth embodiment, as illustrated in FIGS. 25 and 26, the communication system uses a car navigation system 43, USB memory 44 as an example of mobile storage terminals, and a personal computer 45. Hereinafter, the car navigation system is denoted as the "navigation system" and the personal computer as the "PC." The USB memory 44 may be replaced by an SD card, for example.

(1) The user operates the navigation system 43 while the USB memory 44 is connected to the navigation system 43 in the vehicle. (2) The vehicle configuration information is written to the USB memory 44. This information is digitally signed through the use of the vehicle's private key. (3) The user removes the USB memory 44 from the navigation system 43.

(4) The user connects the USB memory 44 to the PC 45, operates the PC 45, and transmits vehicle configuration information to the OTA center 1 by using a corresponding PC application. The OTA center 1 verifies the received vehicle configuration information based on a digital signature and, if the verification result is successful, searches for a distribution package applicable to the information. (5) The user uses the PC application to download the distribution package to the PC 45 and writes it to the USB memory 44. At this time, the vehicle model information and the vehicle configuration information before the update are additionally written to the distribution package.

(6) The user re-connects the USB memory 44 to the navigation system 43 in the vehicle. (7) The user operates the navigation system 43 and (8) transmits the RP metadata and DL metadata stored in the USB memory 44 to the OTA master 32. (9) The OTA master 32 verifies whether the distribution package is compatible with the subject vehicle. (10) If the verification result is successful, the OTA master 32 instructs the target ECU 33 to download the update data to the target ECU 33 and execute the installation and activation.

According to the fifth embodiment as above, the user can use the navigation system 43 or PC 45 to write the necessary information or distribution package acquired from the OTA center to the USB memory 44. The update data can be downloaded from the USB memory 44 via the navigation system 43 and then from the OTA master 32 to the target ECU 33.

Other Embodiments

The contents of RP metadata and DL metadata may be changed as appropriate according to individual designs.

The mobile information terminal is not limited to the smartphone 42 or the PC 45.

The mobile storage terminal or a mobile storage medium is not limited to the USB memory 44 or the SD card.

Although the present disclosure has been described in accordance with the embodiments, it is understood that the present disclosure is not limited to the embodiments and structures disclosed therein. The present disclosure incorporates various modifications and variations within the scope of equivalents. Furthermore, various combination and configuration, and other combination and configuration including one, more than one or less than one element may be made in the present disclosure.

Means and/or functions provided by each device or the like may be provided by software recorded in a substantive memory device and a computer that can execute the software, software only, hardware only, or some combination of them. For example, if the control device is provided by an electronic circuit that is hardware, the control device may be provided by a digital circuit or an analog circuit that includes a large number of logic circuits. The substantive memory device corresponds to a non-transitory computer readable storage medium.

The controller and the method according to the present disclosure may be implemented by a dedicated computer provided by constituting a processor and a memory programmed to execute one or more functions embodied by a computer program. Alternatively, the control unit and the method described in the present disclosure may be implemented by a dedicated computer provided by forming a processor with one or more dedicated hardware logic circuits. Alternatively, the control unit and the method described in the present disclosure may be implemented by one or more dedicated computers including a combination of a processor and a memory programmed to execute one or multiple functions and a processor including one or more hardware logic circuits. The computer program may also be stored on a computer-readable and non-transitory tangible recording medium as an instruction executed by a computer.

What is claimed is:

1. An in-vehicle communication system comprising:
- a center device that transmits update data as a distribution package to an electronic control unit as a target device installed in a vehicle;
- a master device that is installed in the vehicle, receives the distribution package, and transfers the update data to the target device; and
- the target device that writes the update data transferred from the master device to a storage portion, wherein:
- the center device transmits reprogramming policy metadata indicating configuration information on the distribution package to the master device;
- the reprogramming policy metadata has a three-layer structure including
  - a distribution layer to store communication protocol and communication destination information,
  - a master layer to store information on a platform of the master device, and
  - a target layer to store information on a platform of the target device;
- when interpreting the reprogramming policy metadata and determining that the distribution package is compatible with a subject vehicle, the master device requests the center device for download metadata that stores control information for acquiring data needed for each of three layers including the distribution layer, the master layer and the target layer; and
- when the center device transmits the download metadata to the master device and the master device interprets the download metadata and acquires necessary data, the master device performs data update control of the target device.

2. The in-vehicle communication system according to claim 1, wherein:

- the reprogramming policy metadata includes, as parameters for the master layer, platform type information on the master device and control method type information on a platform;
- the reprogramming policy metadata includes, as parameters for the target layer, platform type information on the target device, control method type information on a platform, and type information on a data transfer method from the center device to the target device; and
- the master device compares each of the information with design configuration information managed by the master device itself to determine whether the distribution package is compatible with the subject vehicle.

3. The in-vehicle communication system according to claim 2, wherein
- the download metadata includes, as parameters for each layer, URI (Uniform Resource Identifier) of a data acquisition destination, a hash value attached to data, ID of the target device, and type information on data transfer method from the center device;
- the download metadata includes, as parameters for the master layer and the target layer, platform type information on the master device and the target device; and
- the master device acquires data needed for each layer at necessary timing based on each of the information and performs data update control of the target device.

4. The in-vehicle communication system according to claim 2, wherein
- the platform type information relates to software architectures of the master device and the target device and indicates a software architecture including either an adaptive platform or a classic platform as device type specified in AUTOSAR specification; and
- the type information on the data transfer method is either a storage method or a streaming method.

5. The in-vehicle communication system according to claim 4, wherein
- the platform type information further is either in-vehicle Linux (registered trademark) or Android (registered trademark).

6. The in-vehicle communication system according to claim 4, wherein
- the center device specifies a plurality of distribution packages when, in the master layer for the download metadata, the type information on the data transfer method is defined as a storage method.

7. The in-vehicle communication system according to claim 1, wherein
- a mobile information terminal or a mobile storage medium is capable of being set as communication destination information of the reprogramming policy metadata; and
- the master device is capable of acquiring the distribution package transmitted from the center device via the mobile information terminal or the mobile storage medium, based on the communication destination information.

8. The in-vehicle communication system according to claim 7, wherein:
- the center device notifies the mobile information terminal of information on the update data;
- when a user operates the mobile information terminal to specify the mobile information terminal or the mobile storage medium as a transmission destination of the update data, the center device transmits the update data to the mobile information terminal or the mobile storage medium;

the center device sets the communication destination information to the mobile information terminal or the mobile storage medium, and then sequentially transmits the reprogramming policy metadata and the download metadata to the master device; and the master device receives the distribution package from the mobile information terminal or the mobile storage medium, based on the communication destination information.

9. The in-vehicle communication system according to claim 7, wherein:

the master device causes an in-vehicle device connected with a mobile storage medium to write information, necessary for data update control over the subject vehicle, to the mobile storage medium;

the master device causes the mobile information terminal to access the center device based on information written in the mobile storage medium, and thereby acquires and writes the reprogramming policy metadata, the download metadata, and a corresponding distribution package to the mobile storage medium;

the center device sets the communication destination information in the reprogramming policy metadata to the mobile storage medium;

when the reprogramming policy metadata and the download metadata are transferred from the in-vehicle device connected with the mobile storage medium to the master device, the master device receives the distribution package from the mobile storage medium according to the communication destination information.

10. The in-vehicle communication system according to claim 1, wherein:

the download metadata includes, as parameters in the master layer and the target layer, encryption type information, signature type information, encryption mode type information, and type information on data to be encrypted or signed;

the encryption type information corresponds to one of AES, Triple-DES, RSA, and ECC;

the signature type information corresponds to one of CBC-MAC, CMAC, DSA, and ECDSA;

the encryption mode type information corresponds to one of Enc then MAC, MAC then, and ENC;

the center device encrypts and signs the data to be encrypted or signed according to each of the information; and the master device decrypts the data to be encrypted or signed according to each of the information.

11. The in-vehicle communication system according to claim 1, wherein:

the download metadata includes protection target information as parameters in the master layer and the target layer;

the protection target information specifies whether all or part of the distribution package needs to be encrypted and digitally signed;

the center device encrypts and signs data to be encrypted or signed according to the protection target information; and the master device decrypts the data to be encrypted or signed according to the protection target information.

12. A non-transitory computer readable storage medium storing a data structure of reprogramming policy metadata to indicate configuration information on a distribution package, the reprogramming policy metadata being used by a computer included in a center device to transmit update data as a distribution package to an electronic control unit as a target device installed in a vehicle and by a computer included in a master device that is installed in the vehicle, receives the distribution package, and transfers the update data to the target device, wherein the reprogramming policy metadata has a three-layer structure composed of a distribution layer to store communication protocols and communication destination information, a master layer to store information on a platform of the master device, and a target layer to store information on a platform of the target device;

the reprogramming policy metadata is used for a processing in which the center device transmits the reprogramming policy metadata to the master device, and the master device interprets the reprogramming policy metadata, determines that the distribution package is compatible with a subject vehicle, and requests the center device for download metadata storing control information for acquiring data needed for each of three layers.

13. The non-transitory computer readable storage medium storing the data structure of reprogramming policy metadata according to claim 12, comprising:

platform type information on a master device and control method type information on a platform as parameters in the master layer, and platform type information on a target device, control method type information on a platform, and type information on a data transfer method from the center device to a target device as parameters in the target layer, wherein the reprogramming policy metadata is used for a processing in which the master device compares each of the information with design configuration information managed by the master device itself to determine whether the distribution package is compatible with the subject vehicle.

14. The non-transitory computer readable storage medium storing the data structure of reprogramming policy metadata according to claim 13, wherein the platform type information relates to software architectures of the master device and the target device and indicates either an adaptive platform or a classic platform as a device type specified in AUTOSAR specifications; and the type information on the data transfer method is either a storage method or a streaming method.

15. The non-transitory computer readable storage medium storing the data structure of reprogramming policy metadata according to claim 14, wherein the platform type information further includes either in-vehicle Linux (registered trademark) or Android (registered trademark).

16. The non-transitory computer readable storage medium storing the data structure of reprogramming policy metadata according to claim 12, wherein a mobile information terminal or a mobile storage medium is capable of being set as the communication destination information; and the reprogramming policy metadata is used for a processing in which the master device acquires the distribution package transmitted from the center device according to the communication destination information via the mobile information terminal or the mobile storage medium.

17. A non-transitory computer readable storage medium storing a data structure of download metadata for which the master device requests a center device through use of the data structure of the reprogramming policy metadata according to claim 12, comprising:

URI (Uniform Resource Identifier) of a data acquisition destination, a hash value attached to data, an ID of the target device, and type information on a data transfer method from the center device as parameters for each of the distribution layer, the master layer, and the target layer; and platform type information on a master device and a target device as parameters in the master layer and the target layer, wherein the download metadata is used for a processing in which the master device acquires data needed for each layer at necessary timing based on each of the information and performs a data update control of the target device.

18. The non-transitory computer readable storage medium storing the data structure of download metadata according to claim 17, wherein:

the platform type information relates to software architectures of the master device and the target device and corresponds to one of an adaptive platform, a classic platform as a device type specified in AUTOSAR specifications, in-vehicle Linux (registered trademark), or Android (registered trademark); and the type information on the data transfer method is either a storage method or a streaming method.

19. The non-transitory computer readable storage medium storing the data structure of download metadata according to claim 18, wherein a plurality of distribution packages can be specified when a storage method is designated as the type information on the data transfer method in the master layer.

20. The non-transitory computer readable storage medium storing the data structure of download metadata according to claim 17, comprising:

encryption type information, signature type information, encryption mode type information, and type information on data to be encrypted or signed as parameters in the master layer and the target layer, wherein:

the encryption type information corresponds to one of AES, Triple-DES, RSA, and ECC;

the signature type information corresponds to one of CBC-MAC, CMAC, DSA, and ECDSA;

the encryption mode type information corresponds to one of Enc then MAC, MAC then, and ENC; and the download metadata is used for a processing in which the center device encrypts and signs the data to be encrypted or signed according to each of the information and the master device decrypts the data to be encrypted or signed according to each of the information.

21. The non-transitory computer readable storage medium storing the data structure of download metadata according to claim 17, comprising:

protection target information as parameters in the master layer and the target layer;

wherein the protection target information specifies whether all or part of a distribution package needs to be encrypted and digitally signed, and the download metadata is used for a processing in which the center device encrypts and signs the data to be encrypted or signed according to the protection target information and the master device decrypts the data to be encrypted or signed according to the protection target information.

22. An in-vehicle communication system comprising:

a center device that transmits update data to a target device as an electronic control unit installed in a vehicle;

a master device that is installed in the vehicle, receives the update data as a distribution package, and transfers the update data to the target device;

the target device that writes the update data transferred from the master device into a storage portion, wherein:

the center device transmits reprogramming policy metadata indicating configuration information on the distribution package to the master device;

when interpreting the reprogramming policy metadata and determining that the distribution package is compatible with a subject vehicle, the master device requests the center device for download metadata indicating information for acquiring the update data for the target device, and when the center device transmits the download metadata to the master device, the master device interprets the download metadata, acquires necessary data, and perform data update control of the target device.

23. The in-vehicle communication system according to claim 22, wherein the reprogramming policy metadata at least includes a master layer to store information on a platform of the master device and a target layer to store information on a platform of the target device, and the download metadata stores control information for acquiring data needed for each of the master layer and the target layer.

24. The in-vehicle communication system according to claim 23, wherein the information on the platform of the master device includes platform type information and control method type information on the platform, and the information on the platform of the target device includes platform type information, the control method type information on the platform, and the type information on data transfer method from the center device to the target device.

25. The in-vehicle communication system according to claim 22, wherein when the master device interprets the reprogramming policy metadata, the master device compares each of information on a platform of the master device and information on the platform of the target device indicated in the reprogramming policy metadata with design configuration information managed by the master device itself to determine whether the distribution package is compatible with the subject vehicle.

26. An in-vehicle communication system comprising:

a center device that transmits update data to a target device as an electronic control device installed in a vehicle; and a master device that is installed in the vehicle, receives the update data as a distribution package, and transfers the update data to the target device, wherein the center device transmits reprogramming policy metadata indicating configuration information on the distribution package to the master device;

when the master device interprets the reprogramming policy metadata and determines that the distribution package is compatible with a subject vehicle, the master device requests the center device for download metadata indicating information for acquiring update data for the target device, and when the center device transmits the download metadata to the master device, the master device interprets the download metadata to obtain necessary data and performs data update control including writing update data into a storage unit of the target device.

27. A non-transitory computer readable storage medium storing a program for generating metadata executed by a computer configuring a center device that transmits a distribution package including update data to a target device as an electronic control device installed in a vehicle, the program comprising:

generating reprogramming policy metadata indicating configuration information on the distribution package and download metadata storing control information for acquiring data needed for each of three layers, wherein the reprogramming policy metadata has a three-layer structure; a distribution layer to store communication protocol and communication destination information, a master layer to store information on a platform of a master device transferring the update data to the target device, and a target layer to store information on a platform of the target device;

specifying data format and each item of the reprogramming policy metadata and the download metadata;

acquiring data corresponding each information for generating the reprogramming policy metadata and the download metadata;

generating the reprogramming policy metadata which includes, as parameters for the master layer, platform type information on the master device and control method type information on a platform, and also includes, as parameters for the target layer, platform type information on the target device, control method type information on a platform, and type information on a data transfer method from the center device to the target device; and generating the download metadata which includes, as parameters for each layer, URI (Uniform Resource Identifier) of a data acquisition destination, a hash value attached to data, ID of the target device, and type information on data transfer method from the center device, and as parameters for the master layer and the target layer, platform type information on the master device and the target device.

28. A master device that is installed in a vehicle together with a target device as an electronic control device, transfers update data to the target device when receiving a distribution package including the update data from a center device, receiving reprogramming policy metadata indicating configuration information on the distribution package from the center device, requesting the center device for download metadata indicating information for acquiring the update data of the target device when determining that the distribution package is compatible with a subject vehicle by interpreting the reprogramming policy metadata, interpreting the download metadata to acquire necessary data when receiving the download metadata from the center device and performing data update control of the target device.

29. A method for data update control comprising:

transferring update data to a target device as an electronic control device installed in a vehicle when receiving a distribution package including the update data from a center device;

receiving reprogramming policy metadata indicating configuration information on the distribution package from the center device;

requesting the center device for download metadata indicating information for acquiring the update data of the target device when determining that the distribution package is compatible with a subject vehicle by interpreting the reprogramming policy metadata;

interpreting the download metadata to acquire necessary data when receiving the download metadata from the center device; and performing data update control of the target device.

* * * * *